US007260054B2

(12) United States Patent
Olszewski

(10) Patent No.: US 7,260,054 B2
(45) Date of Patent: Aug. 21, 2007

(54) SINR MEASUREMENT METHOD FOR OFDM COMMUNICATIONS SYSTEMS

(75) Inventor: Kim Joseph Olszewski, Carlsbad, CA (US)

(73) Assignee: Denso Corporation, Kariya-shi (JP)

( * ) Notice: Subject to any disclaimer, the term of this patent is extended or adjusted under 35 U.S.C. 154(b) by 1068 days.

(21) Appl. No.: 10/161,133

(22) Filed: May 30, 2002

(65) Prior Publication Data

US 2003/0223354 A1 Dec. 4, 2003

(51) Int. Cl.
*H04J 11/00* (2006.01)

(52) U.S. Cl. ...................................... 370/208; 370/343

(58) Field of Classification Search ................ 370/208, 370/210, 252, 335, 342, 343

See application file for complete search history.

(56) References Cited

U.S. PATENT DOCUMENTS

| 6,128,350 | A * | 10/2000 | Shastri et al. | 375/260 |
| 6,456,653 | B1 * | 9/2002 | Sayeed | 375/227 |
| 2002/0110138 | A1 * | 8/2002 | Schramm | 370/430 |

\* cited by examiner

*Primary Examiner*—Huy D. Vu
*Assistant Examiner*—Christine Ng
(74) *Attorney, Agent, or Firm*—Morrison & Foerster LLP

(57) ABSTRACT

A signal to interference-plus-noise power ratio (SINR) measurement method for wireless communications systems which employ orthogonal frequency division multiplexing (OFDM) for multicarrier data transmission is disclosed. Fast-Fourier transform (FFT)-based SINR measurements can be computed on frame-by-frame or greater interval for individual or groupings of subchannel signals. Given a known transmitted time-domain OFDM frame preamble, and the corresponding channel and interference-plus-noise (IPN) corrupted received time-domain frame preamble, the disclosed method first computes the power spectral densities of the received signal of interest and of a received unwanted interference-plus-noise signal. The FFT-computed power spectral densities are then used to compute average received signal and received IPN power measurements for specified individual or groupings of OFDM subchannel signals. The power measurements are then frame-averaged using a recursive exponential smoothing method. The frame-averaged signal and IPN power measurements are then used to form quantized measurements of SINR for the specified OFDM subchannel signals of the received frame.

30 Claims, 15 Drawing Sheets

Subcarrier Signals 0 to 7
(Top to Bottom)

Subcarrier Signals 8 to 15
(Top to Bottom)

Note: Filled circles are imaginary part. Open circles are real part.

SINR MEASUREMENT METHOD FOR OFDM COMMUNICATIONS SYSTEMS

BACKGROUND OF THE INVENTION

1. Field of the Invention

This invention relates to wireless communication systems that employ orthogonal frequency division multiplexing (ODFM) for multicarrier data transmission. More particularly, this invention relates to signal to interference-plus-noise power ratio (SINR) measurement for subchannel signals within an ODFM communication system.

2. Description of Related Art

Channel Quality Measurements for Cellular Network System Adaptation

Cellular network system adaptation methods are utilized when network self-optimization is required because of a changing operating environment. The essential and principal property of an adaptation method is its time-varying, self-adjusting operation in order to optimize a desired system performance objective. Adaptation methods are commonly employed within cellular network systems in order to increase network capacity, increase network data rates and to improve network coverage and reliability.

Dynamic channel allocation (DCA) and transmit power control (TPC) are commonly used cellular network adaptation methods that enable a wireless communications terminal to adapt to its operating environment. DCA and TPC perform the following steps: (1) rank all available channels in terms of channel quality, (2) select and connect to the optimal channel available, and (3) operate within the selected channel at the minimal power required for a desired link quality of service. DCA is used for ranking and selecting the best channel available and TPC for adaptive power adjustment within the channel selected. Together DCA and TPC adaptively improve link quality and reliability, increase network coverage, facilitate increased network data rates, and minimize interference to other operating network terminals. Throughout the world, communications standards groups for wireless personal, local and metropolitan area networks are incorporating DCA and TPC into their physical (PHY) and medium access control (MAC) layers.

Adaptive channel coding and modulation (ACM) is another commonly used cellular network adaptation method in which channel coding and signal modulation are adapted to a changing environment in order to increase network data rates. Cellular network terminals with good channel quality measurements may be adaptively assigned high code rates and high-order signal modulations whereas terminals with poor channel quality measurements may be assigned low code rates and low-order modulations. A high-order modulation will increase a transmitting terminal's data rate. However, it will also be more susceptible to interference, especially when a transmitting terminal's signal power is weak. Low-order modulation is not as efficient in terms of data rate but is more immune to network interference.

Accurate and robust channel quality measurements are crucial in the implementation of the above cellular network adaptation methods and others not mentioned. Errors in channel quality measurements and delay in acquiring them may cause a network terminal to select the wrong channel for transmission, select the wrong channel coding and modulation and either transmit at too high a power, wasting network resources, or at too low a power, raising the frame error rate. Common channel quality measurements proposed in the prior art include Received Signal Strength Indicator (RSSI) words, Signal to Interference-plus-Noise Power Ratio (SINR) measurements, uncoded Bit Error Rate (BER) measurements and Frame Error Rate (FER) measurements.

RSSI words can be computed at the analog front-end of a receiver without receiver demodulation lock. RSSI words can provide reasonably reliable channel quality measurements for low interference channels even if the power of a received signal is low. However, for high-interference channels, RSSI words are inaccurate and unreliable.

In contrast to RSSI words, SINR measurements require receiver demodulation lock but provide channel quality measurements in terms of both received signal and interference-plus-noise power. In addition, SINR measurements computed via digital signal processing operations can have much more accuracy and resolution than RSSI words derived in the analog domain. SINR measurements are more appropriate than uncoded BER measurements, FER measurements or RSSI words as a channel quality metric near a cell boundary where signal quality may be rapidly changing due to signal propagation distance and interference.

Uncoded BER is defined as BER observed at the input to a channel decoder. The number of uncoded bit errors used to derive BER measurements can be quickly computed by comparing bits from known transmitted frame preambles with bits from received frame preambles. Uncoded BER measurements also require receiver demodulation lock and also provide information on the quality of a demodulated signal. Uncoded BER measurements are computed by a bit averaging method. Due to averaging, uncoded BER measurements may not be very accurate, especially at low BERs for which extremely long averaging windows are required. Further, because of averaging, uncoded BER measurements may not adjust fast enough to channel or interference conditions that are quickly changing. Consequently, uncoded BER measurements are usually too slow for purposes of ACM, TPC and handoff protocols.

Uncoded BER measurements and RSSI words may also be used together for better measurement of channel quality. For example, high uncoded BER measurements and high-signal-level RSSI words are indicative of channel interference; low uncoded BER measurements and low-signal-level RSSI words are indicative of a received signal of interest with low power; low uncoded BER measurements and high-signal-level RSSI words are indicative of a received signal of interest with high power. If an uncoded BER measurement is high and a low-signal-level RSSI word is received then the decrease in channel quality may be the result of a weak signal of interest or a weak interference signal being received. This last situation creates problems for TPC methods. Weak signal reception typically results in power increases from a TPC method. If the received weak signal is an interference signal, an increase in power will result in more network interference.

FER measurements are also obtained by bit averaging methods. Typically, FER measurements are computed by averaging frame error indicator bits output by a cyclic redundancy check decoder. FER measurements provide the best indication of channel quality because they are computed using the received data-carrying signal after it has been demodulated and decoded. However, because FER measurements are obtained by averaging methods they have the same disadvantages as uncoded BER measurements.

OFDM for Multicarrier Data Transmission

Orthogonal frequency division multiplexing (OFDM) is a technique for multicarrier data transmission that has been standardized for several wireless network physical layers. The main principle of the OFDM technique is the division of an allocated channel into N (a power of 2) orthogonal subchannels. Each subchannel has an equal bandwidth and is centered on the unique frequency of a subcarrier signal. The subcarrier signals are orthogonal, meaning the inner product of any two of the N subcarriers equals zero. The discrete frequencies of the orthogonal subcarrier signals are equally and minimally spaced so data modulation of the subcarrier signals facilitates optimal bandwidth efficiency. In comparison, frequency division multiplexing (FDM) for multicarrier data transmission utilizes non-orthogonal subcarrier signals and therefore wastes large segments of allocated channel bandwidth in order to isolate subcarrier signal frequency spectra.

FIG. 1 shows a simple top-level conceptual model of an OFDM communications system which will now be described. More detailed descriptions can be found in (1) L. Hanzo, W. Webb, T. Keller, "Single- and Multi-Carrier Quadrature Amplitude Modulation," Wiley/IEEE Press 1999, (2) R. van Nee and R. Prasad, "OFDM for Wireless Multimedia Communications," Norwood, Mass.: Artech House, 2000, or (3) T. Keller and L. Hanzo, "Adaptive Multicarrier Modulation: A Convenient Framework for Time-Frequency Processing in Wireless Communications," Proceedings of the IEEE, Vol. 88, No. 5, May 2000, pp. 611-640, all of which are incorporated by reference herein.

Let integer $n \geq 1$ denote the symbol number in a sequence of transmitted OFDM symbols and positive integer N (a power of 2) the number of OFDM subchannels. Let the N-vector $$S_N = \{0, 1, \ldots, N-1\}$$

contain the indices of all N OFDM subchannels.

Referring to FIG. 1, data source 6 outputs samples of a frequency-domain scalar-valued signal to buffer 8. Each sample produced by data source 6 is a complex-valued sample in a signal constellation. Each sample may have a different channel coding, be from a different signal constellation, or have a different amplitude.

Buffer 8 transforms the scalar-valued signal from data source 6 into a vector-valued signal by collecting N successive samples. The nth complex-valued vector produced by buffer 8 is a length-N frequency-domain vector $$U[n] = \{U_s[n], s \in S_N\}.$$

The N elements in U[n] are frequency-domain subchannel signal samples to be transmitted.

Block 10 modulates U[n] by N orthogonal subcarrier signals. Block 10 performs the modulation by a matrix-vector multiplication using an inverse discrete Fourier transform (IDFT) matrix or equivalently a fast Fourier transform (IFFT) matrix and the vector U[n]. Rows of the IFFT matrix contain the subcarrier signals that are equally spaced in frequency. The IFFT operation transforms frequency-domain vector U[n] into a time-domain length-N OFDM symbol $$u[n] = \{u_s[n], s \in S_N\}.$$

Elements in OFDM symbol u[n] are time-domain subchannel signal samples to be transmitted. By properties of the IFFT matrix used to implement orthogonal subcarrier modulation, each time-domain subchannel signal will have a different and equally spaced frequency. Because the subchannel signals are produced by orthogonal subcarrier modulation the N transmitted subchannel signals will be corrupted differently by a channel transfer function.

Time-domain OFDM symbol u[n] is input to flat-fading channel plus noise and interference block 12. The channel and interference-plus-noise corrupted length-N time-domain OFDM symbol at the output of block 12 is $$v[n] = \{v_s[n], s \in S_N\},$$

where the sth received time-domain subchannel signal sample in v[n] is $$v_s[n] = h_s[n]u_s[n] + e_s[n].$$

Here $h_s[n]$ denotes a sample of an unknown time-varying complex-valued channel process, $u_s[n]$ an unknown channel input sample from u[n], and $e_s[n]$ an unknown sample of complex-valued signal which models interference-plus-noise (IPN).

Block 14 performs the inverse operations of block 10. Specifically, given the received time-domain length-N OFDM symbol v[n] block 14 performs orthogonal subcarrier demodulation by a matrix-vector multiplication using a fast Fourier transform (FFT) matrix and the received time-domain OFDM symbol v[n]. Rows of the FFT matrix contain the complex-conjugated values of the IFFT matrix of block 10. The FFT operation transforms time-domain OFDM symbol v[n] back into a length-N frequency-domain vector $$V[n] = \{V_s[n], s \in S_N\}.$$

Elements in frequency-domain vector V[n] are channel and interference-plus-noise corrupted frequency-domain subchannel signal samples.

Block 16 performs the inverse operation of buffer 8. Block 16 unbuffers frequency-domain vector V[n] into a scalar-valued signal, and sequentially outputs elements in frequency-domain vector V[n] beginning with $V_0[n]$ and ending with $V_{N-1}[n]$. The frequency-domain samples are sequentially input to data sink 18 which performs the inverse operation of data source 6.

As just described, each subchannel signal is modulated by a unique subcarrier signal and therefore corrupted differently by a channel transfer function. This characteristic can be exploited by cellular network adaptation methods by adaptively assigning or adjusting individual or groupings of subchannel signals in order to increase network capacity, increase network data rates and to improve network coverage and reliability. Indeed, for adaptation within an OFDM-based cellular network system, channel quality measurements for individual or groupings of subchannel signals are highly beneficial. Embodiments of the present invention provide SINR measurements for individual or groupings of OFDM subchannel signals.

SUMMARY OF THE INVENTION

Orthogonal Frequency Division Multiplexing (OFDM) as briefly described above is a technique for multicarrier data transmission that divides an available communications channel of fixed bandwidth into N (a power of 2) orthogonal subchannels. For example, FIG. 2 shows the division of an allocated channel of unit bandwidth into N=16 orthogonal subchannels, each of bandwidth 1/N. Note that in an actual OFDM system implementation typically 64 to 4096 subchannels will be employed. The N subchannels are used to transmit N subchannel signals that may have different channel codings, signal constellations, and amplitudes. Individual subchannel signals or groupings of subchannel signals may be used for many purposes in cellular networks. For example, individual subchannel signals or groupings of subchannel signals may be assigned to different users or logical channels within an OFDM communications system.

In a typical OFDM communications system such as one for implementing a broadcast digital television system, a wireless metropolitan area network (WMAN) or a wireless local area network (WLAN), data is transmitted in groups of time-domain OFDM symbols known as frames. FIG. 3 shows a simple exemplary OFDM frame 500 comprised of a time-domain OFDM preamble symbol 504 and a time-domain OFDM data symbol 502. A more complicated frame would be constructed from of a number of time-domain OFDM data symbols called an OFDM data packet. Additionally, more than one preamble symbol may be used. Depending on the application, frames can be transmitted continuously, as in the broadcast of digital television or at random times as in the implementation of a WMAN or WLAN.

Every frame transmitted in a typical OFDM communications system contains a frame preamble. An OFDM receiver may use the preamble for frequency synchronization, timing synchronization or channel quality measurement. Time-domain methods (RSSI, SINR, BER, FER) as described above are not optimal and are complex for channel quality measurement of individual or groupings of OFDM subchannel signals. Furthermore, obtaining accurate and stable channel quality measurements for subchannel signals in the time-domain is difficult because interference-plus-noise (IPN) signals may be bursty and highly nonstationary. An OFDM-based communications system requires an FFT module for orthogonal subcarrier modulation and demodulation. The FFT module may be further utilized for channel quality measurements in the frequency domain. A need exists for a frequency-domain method that provides accurate and stable channel quality measurements for individual or groupings of subchannel signals within an OFDM communications system.

In embodiments of the present invention, a fast-Fourier transform (FFT)-based SINR measurement method for OFDM communications systems is disclosed. SINR measurements for received OFDM subchannel signals are computed in the frequency-domain by a novel application of a stable nonparametric signal processing methodology. Using the disclosed method, SINR measurements can be computed on frame-by-frame basis for received signals associated with individual subchannels or groups of subchannels.

To summarize the invention some definitions are first given. Let positive real value $T_S$ denote a baseband information signal sampling interval. Let integer $n \geq 1$ denote the OFDM frame number in a sequence of transmitted OFDM frames and positive integer N (a power of 2) the number of subchannels. Let the N-vector $$S_N = \{0, 1, \ldots, N-1\}$$

contain the indices of all N OFDM subchannels.

FIG. 4 shows another simple top-level conceptual model of an OFDM communications system according to an embodiment of the present invention. FIG. 4 is similar to FIG. 1 but the data source in FIG. 4 is frame preamble source 4 known by all terminals within an OFDM communications system. Frame preamble source 4 outputs samples of a known frequency-domain scalar-valued signal at a rate of $1/T_S$ samples per second to buffer 8.

Referring to FIG. 4, frequency-domain vector $$X[n] = \{X_s[n], s \in S_N\}$$

output from buffer 8, time-domain OFDM frame preamble symbol $$x[n] = \{x_s[n], s \in S_N\}$$

output from orthogonal subcarrier MOD 10, and time-domain OFDM symbol $$y[n] = \{y_s[n], s \in S_N\}$$

output from block 12 are produced in exactly the same manner as described above for FIG. 1. Given known frame preamble $x[n]$ and channel corrupted frame preamble $y[n]$, embodiments of SINR measurement apparatus 63 first compute power spectral density (PSD) vectors $$S_{xx}[n] = \{S_{xx}[n,s], s \in S_N\},$$

$$S_{yy}[n] = \{S_{yy}[n,s], s \in S_N\},$$

and $$S_{xy}[n] = \{S_{xy}[n,s], s \in S_N\},$$

where FFT-computed PSD measurement $$S_{xx}[n, s] = \frac{1}{N^2} \left| \sum_{j=0}^{N-1} w_j x_j[n] \exp(-i 2\pi j s / N) \right|^2$$

in $S_{xx}[n]$ gives a measure of the proportion of total transmit signal power allocated to time-domain subchannel signal sample $x_s[n]$ in $x[n]$. Coefficients $w_j$ are spectral window values (e.g. Hann, Hamming, etc.). FFT-computed PSD measurement $$S_{yy}[n, s] = \frac{1}{N^2} \left| \sum_{j=0}^{N-1} w_j y_j[n] \exp(-i 2\pi j s / N) \right|^2$$

in $S_{yy}[n]$ gives a measure of the total received signal power allocated to time-domain subchannel signal sample $y_s[n]$ in $y[n]$. FFT-computed PSD measurement $$S_{xy}[n, s] = \frac{1}{N^2} \sum_{j=0}^{N-1} w_j y_j[n] \exp(-i 2\pi j s / N) \left( \sum_{j=0}^{N-1} w_j x_j[n] \exp(-i 2\pi j s / N) \right)^*$$

in $S_{xy}[n]$ gives a measure of the total received signal power associated with the product $x_s[n] y_s[n]$. The asterisk superscript denotes complex-conjugation.

Given PSD vectors $S_{xx}[n]$ and $S_{xy}[n]$, embodiments of SINR measurement apparatus 63 compute the PSD vector $$S_{SIG}[n] = \{S_{SIG}[n,s], s \in S_N\},$$

where $$S_{SIG}[n,s] = \frac{|S_{xy}[n,s]|^2}{S_{xx}[n,s]}$$

gives a measure of the proportion of total received signal power allocated to time-domain subchannel signal sample $x_s[n]$ in $x[n]$.

Given PSD vectors $S_{SIG}[n]$ and $S_{yy}[n]$, embodiments of SINR measurement apparatus 63 compute the PSD vector $$S_{IPN}[n] = \{S_{IPN}[n,s], s \in S_N\},$$

where $$S_{IPN}[n,s] = S_{yy}[n,s] - S_{SIG}[n,s]$$

gives a measure of the proportion of total received signal power allocated to the unknown IPN subchannel signal sample $e_s[n]$.

For the nth transmitted OFDM frame, a subchannel grouping or set partition of subchannel vector $S_N$ for integer $0 \leq r \leq N$ is $$G[n] = \{G_0[n], G_1[n], \ldots, G_{r-1}[n]\}.$$

Subchannel grouping $G[n]$ contains r distinct subchannel groups $G_0[n], G_1[n], \ldots, G_{r-1}[n]$ which are disjoint subsets of $S_N$. The ith subchannel group $G_i[n]$ consists of $N_i$ subchannels. The equality $$N_0 + N_1 + \ldots + N_{r-1} = N$$

must be true for a specified subchannel grouping.

FIG. 5 shows an exemplary OFDM system subchannel grouping $G[n]$ for the nth transmitted frame, wherein $N=r=4$ and $$G[n] = \{G_0[n], G_1[n], G_2[n], G_3[n]\},$$

and where $$G_0[n] = \{0,5,10,14\}$$

$$G_1[n] = \{1,7,9,12\}$$

$$G_2[n] = \{2,4,11,13\}$$

$$G_3[n] = \{3,6,8,15\}.$$

Subchannel groups may vary in size frame-by-frame. FIG. 6 shows an exemplary OFDM system subchannel grouping $G[n+1]$ for the (n+1)th transmitted frame, wherein $N=r=4$ and $$G_0[n+1] = \{0,5\}$$

$$G_1[n+1] = \{1,7,9,10,12,14\}$$

$$G_2[n+1] = \{2,3,4,11,13\}$$

$$G_3[n+1] = \{6,8,15\}.$$

Given a subchannel grouping $G[n]$ and PSD vector $S_{SIG}[n]$, embodiments of SINR measurement apparatus 63 compute the signal power vector $$P_{SIG}[G[n]] = \{P_{SIG}[G_i[n]], i=0, \ldots, r-1\},$$

where $$P_{SIG}[G_i[n]] = 10\log_{10}\left(\frac{1}{NT_S}\sum_{s \in G_i[n]} S_{SIG}[n,s]\right)$$

is the average received signal power for subchannel group $G_i[n]$ in $G[n]$. Note that $P_{SIG}[G_i[n]]$ is computing by summing the $N_i$ received signal PSD measurements associated with subchannel group $G_i[n]$.

Given $P_{SIG}[G[n]]$, embodiments of SINR measurement apparatus 63 compute the frame-averaged signal power vector $$P_{AVG\_SIG}[G[n]] = \{P_{AVG\_SIG}[G_i[n]], i=0, \ldots, r-1\},$$

where $$P_{AVG\_SIG}[G_i[n]] = P_{AVG\_SIG}[G_i[n-1]] + \beta(P_{SIG}[G_i[n]] - P_{AVG\_SIG}[G_i[n-1]])$$

is an exponentially smoothed measurement of average received signal power associated with subchannel group $G_i[n]$ in $G[n]$. Real value $0 < \beta \leq 1$ is a smoothing parameter.

Given a subchannel grouping $G[n]$ and vector $S_{IPN}[n]$, embodiments of SINR measurement apparatus 63 compute the IPN power vector $$P_{IPN}[G[n]] = \{P_{IPN}[G_i[n]], i=0, \ldots, r-1\},$$

where $$P_{IPN}[G_i[n]] = 10\log_{10}\left(\frac{1}{NT_S}\sum_{s \in G_i[n]} S_{IPN}[n,s]\right)$$

denotes an estimate of average IPN power associated with subchannel group $G_i$ in $G[n]$. Note that $P_{IPN}[G_i[n]]$ is computing by summing the $N_i$ IPN PSD measurements associated with subchannel group $G_i[n]$.

Given $P_{IPN}[G[n]]$, embodiments of SINR measurement apparatus 63 compute the frame-averaged IPN power vector $$P_{AVG\_IPN}[G[n]] = \{P_{AVG\_IPN}[G_i[n]], i=0, \ldots, r-1\},$$

where $$P_{AVG\_IPN}[G_i[n]] = P_{AVG\_IPN}[G_i[n-1]] + \alpha(P_{IPN}[G_i[n]] - P_{AVG\_IPN}[G_i[n-1]])$$

is an exponentially smoothed measurement of average IPN power associated with subchannel group $G_i[n]$ in $G[n]$. Real value $0 < \alpha \leq 1$ is a smoothing parameter.

Finally, given $P_{AVG\_SIG}[n]$ and $P_{AVG\_IPN}[n]$, SINR measurement apparatus 63 computes the received SINR vector $$\rho[G[n]] = \{\rho[G_i[n]], i=0, \ldots, r-1\},$$

where $$\rho[G_i[n]] = Q(P_{AVG\_SIG}[G[n]] - P_{AVG\_IPN}[G_i[n]])$$

is a quantized measurement of SINR for subchannel group $G_i[n]$ in $G[n]$. Q denotes a uniform or non-uniform quantization function. Thus, for the nth received OFDM preamble symbol, embodiments of the invention provide a quantized SINR measurement set $\rho[G[n]]$ for a specified subchannel grouping $G[n]$.

DETAILED DESCRIPTION OF PREFERRED EMBODIMENTS

Figure 1:
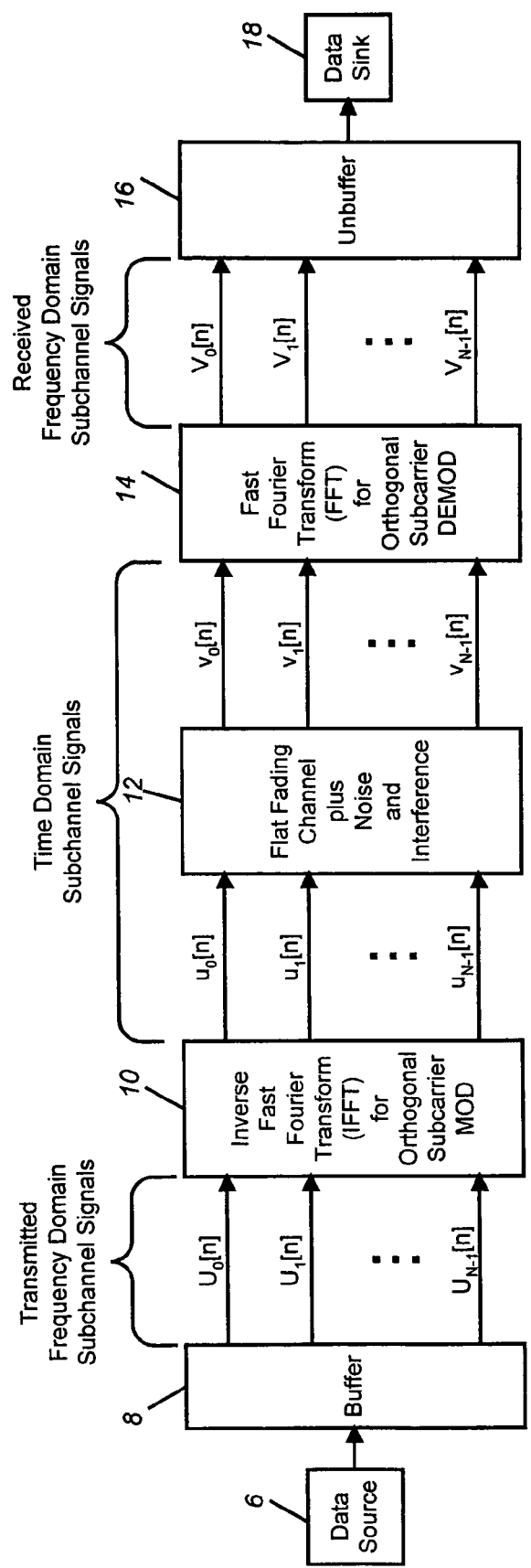
FIG. 1 is a top-level conceptual model of a baseband OFDM communications system.
Figure 2:
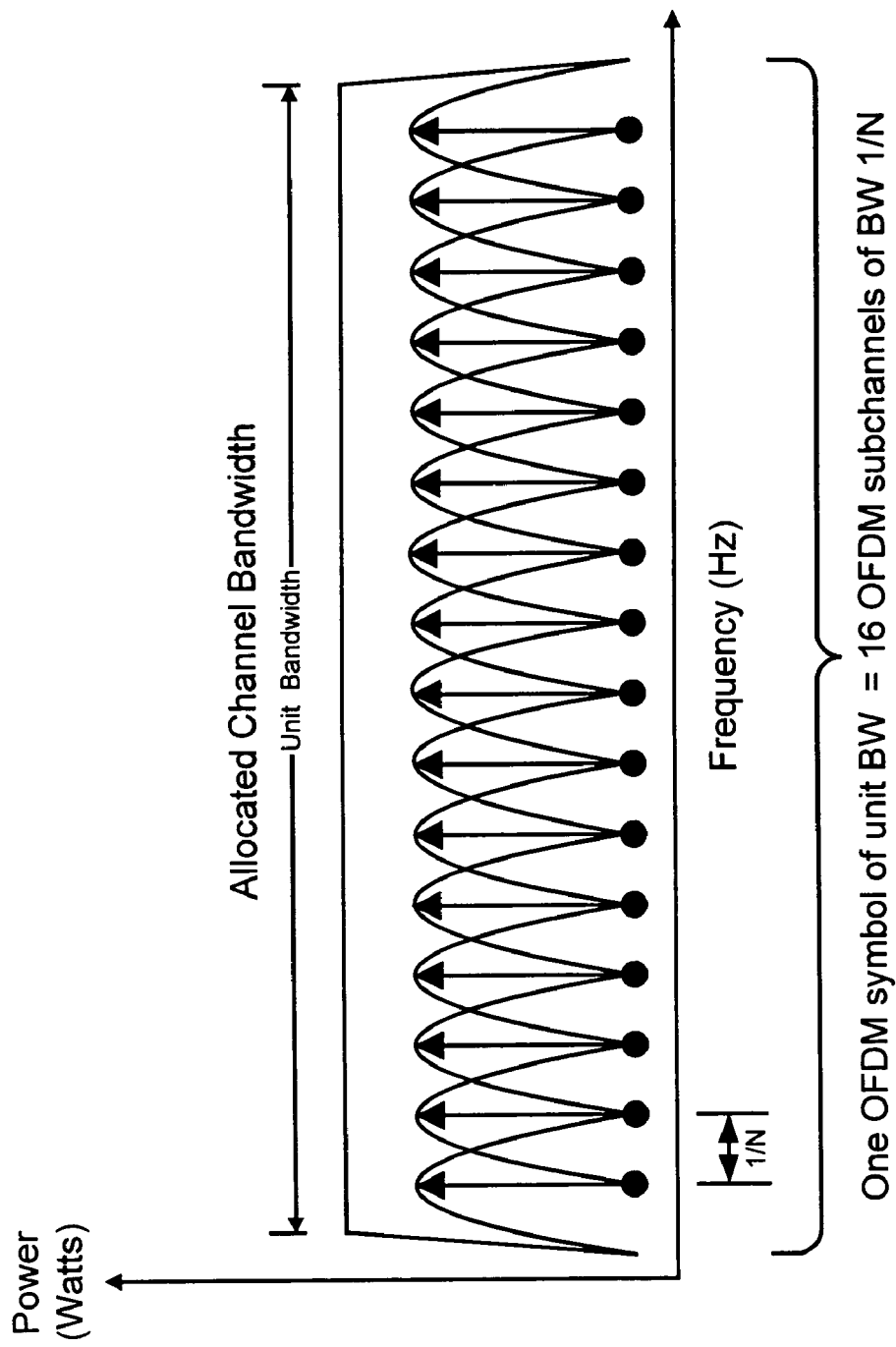
FIG. 2 illustrates the division or sub-channelization of an allocated channel bandwidth into a set of orthogonal OFDM subchannels.

In the following description of the preferred embodiment of the present invention reference is made to the accompanying drawings. It is to be understood that other embodiments may be utilized and structural changes may be made to the drawings without departing from the scope of the preferred embodiment.

The OFDM Communications System

OFDM is a multicarrier data transmission technique that has been standardized for several wireless network physical layers. OFDM symbols are produced by first transforming a scalar-valued frequency-domain information signal into a vector-valued information signal. Samples of the vector-valued frequency-domain signal are then modulated by a set of orthogonal subcarrier signals. Modulation by the orthogonal subcarrier signals is implemented as a matrix-vector product. The matrix employed is an inverse discrete Fourier transform (IDFT) matrix or an equivalent inverse fast Fourier transform (IFFT) matrix. Rows of the IFFT matrix contain orthogonal subcarrier signals which are equally spaced in frequency. Vectors resulting from the IFFT are time-domain OFDM symbols. Over time, samples in transmitted time-domain OFDM symbols may be interpreted and processed as scalar-valued time-domain subchannel signals. Because the rows of the IFFT matrix contain orthogonal subcarrier signals having equally-spaced frequencies, each subchannel signal will have a different frequency. A communications channel will distort/corrupt transmitted subchannel signals differently based on their subcarrier frequencies and the transfer function of the channel. Interference from other signal sources will also distort subchannel signals during transmission.

SINR measurement of individual or groups of subchannel signals can be highly beneficial for numerous cellular adaptation methods commonly employed within OFDM communications systems. For example, different adaptive coding and modulation schemes can be applied to each subchannel signal depending on SINR measurements of received subchannel signals. Adaptive power control can be applied to each subchannel signal depending on the SINR measurements of individual subchannel signals. Adaptive transmit diversity can be implemented by transmitting only on subchannels not severely affected by the channel and/or interference. Multiple user access may be implemented by assigning different users to different sets of subchannel signals depending on SINR measurements of individual or groups of subchannel signals. Logical channelization may also be implemented using the same approach.

Embodiments of the present invention implement a fast-Fourier transform (FFT)-based SINR measurement method for OFDM subchannel signals. SINR measurements for subchannel signals are computed in the frequency-domain by a novel application of a stable and accurate nonparametric signal processing methodology. Using the disclosed method, SINR measurements can be computed on frame-by-frame basis for specific subchannel signals or groups of subchannel signals. The disclosed method allows SNR measurements for specific subchannel signals or groups of subchannel signals to be provided for channel quality updates whenever needed by a cellular network adaptation method. The SINR measurement method can be incorporated into any OFDM-based PHY layer via current hardware technologies, or as software within a programmable digital signal processor.

Figure 7:
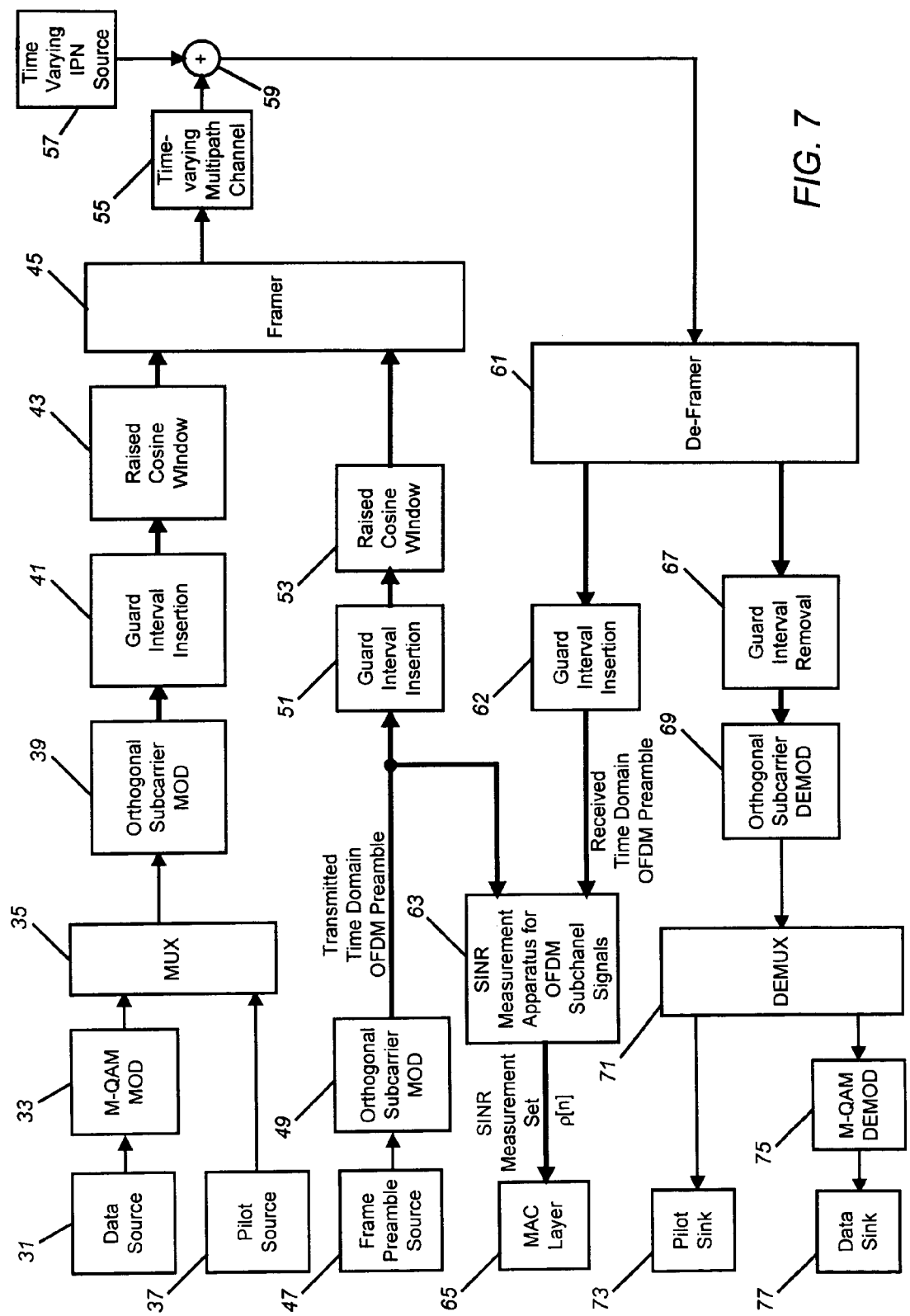
FIG. 7 illustrates a functional block diagram of an exemplary OFDM communications system according to an embodiment of the present invention.

FIG. 7 shows an exemplary functional architecture of an OFDM communications system according to one embodiment of the present invention. It should be understood that the invention description is organized into integrated and interconnected functional modules for purposes of illustration and explanation only. Invention description in terms of functional modules permits flexibility in the actual hardware or software implementation of embodiments of the present invention, but should not be understood to place limitations on the actual implementation. Embodiments of the present invention can be implemented by conventional transceiver technology, including processors/memory, mixers, antennas, amplifiers, filters, diplexers, modulators, demodulators, timing sources and the like, well-understood by those skilled in the art.

All signals in FIG. 7 are discrete-time baseband signals. Scalar-valued signals are represented as thin arrows whereas vector or frame-valued signals are represented by bold face thick arrows. In discussing invention functionality first, let positive real value $T_S$ denote a information source sampling time interval, and integer $n \geq 1$ denote the OFDM frame number in a sequence of transmitted OFDM frames. Let positive integer N (a power of 2) denote the number of subchannels. Let the N-vector $$S_N = \{0, 1, \ldots, N-1\}$$

contain the indices of all N OFDM subchannels.

Referring to FIG. 7, data source 31 produces binary data bits at a rate of $1/T_S$ bits per second. Let signal constellation parameter M be a positive power of 2 (e.g., 2, 4, 8, ..., 256, etc.). $\text{Log}_2 M$ data bits are collected and mapped by M-valued Quadrature Amplitude Modulator (M-QAM) 33 to a point in a specified signal constellation. Each complex-valued point in the signal constellation represents amplitude and phase. Note that if M-QAM Modulator 33 is adaptive, embodiments of the present invention enable adaptive modulation according to measured subchannel signal SINR values. In particular, if measured SINR for a subchannel signal indicates poor subchannel quality, a lower value for M may be specified for the subchannel signal; conversely, for higher quality subchannels, a higher M value may be specified. The larger the value M the higher the data throughput because higher order signal constellations transmit more data bits per signal constellation point (e.g. 256-QAM transmits $\text{Log}_2 256 = 8$ bits per signal constellation point). Thus, for example, if a mobile station (MS) in an OFDM communications network approaches a base station (BS), resulting in higher channel quality, the OFDM modem in the MS may use higher order constellations as it nears the BS.

Pilot source 37 produces a pseudo-random binary phase shift key (BPSK) signal, at a rate of $1/M_{MUX} T_S$ BPSK symbols per second, where $M_{mux} \geq 2$ is a positive integer. The M-QAM data signal produced by M-QAM Modulator 33 and the BPSK pilot signal produced by pilot source 37 are time-multiplexed by MUX 35. Specifically, MUX 35 inserts a BPSK pilot symbol into the M-QAM data signal every $M_{MUX} T_S$ seconds. Hence, BPSK pilot symbols are interspersed within the M-QAM data signal. An OFDM system receiver can utilize the interspersed BPSK pilot symbols to track timing and phase variations and make receiver adjustments. The resulting multiplexed signal at the output of MUX 35 is a complex-valued frequency-domain signal.

Figure 8:
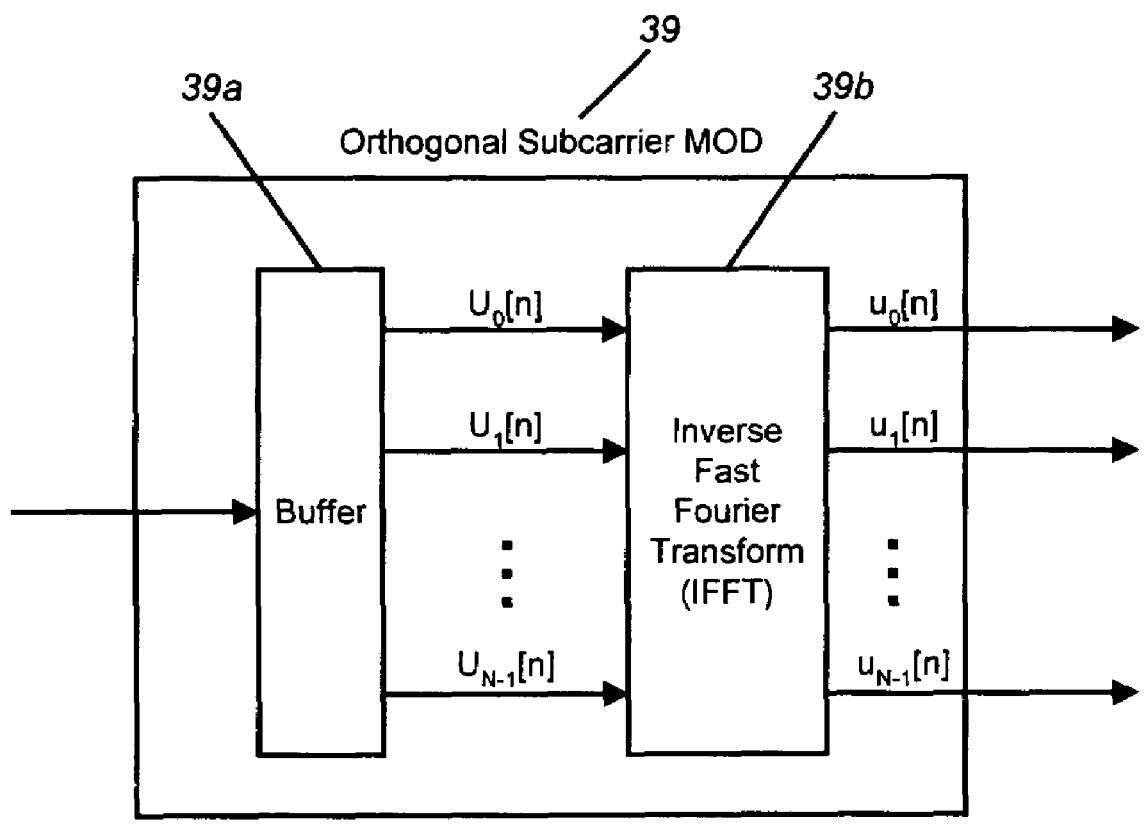
FIG. 8 is a block diagram of an OFDM subcarrier modulator according to an embodiment of the present invention.

FIG. 8 shows the detail of orthogonal subcarrier modulator (MOD) 39 of FIG. 7. Referring to FIG. 8, buffer 39a collects N consecutive samples output from MUX 35 of FIG. 7 to construct a length-N frequency-domain data vector. The nth output produced by buffer 39a is a length-N data vector $$U[n] = \{U_s[n], s \in S_N\}.$$

The N elements in data vector U[n] are frequency-domain subchannel signal samples to be transmitted for the nth frame.

Figure 9:
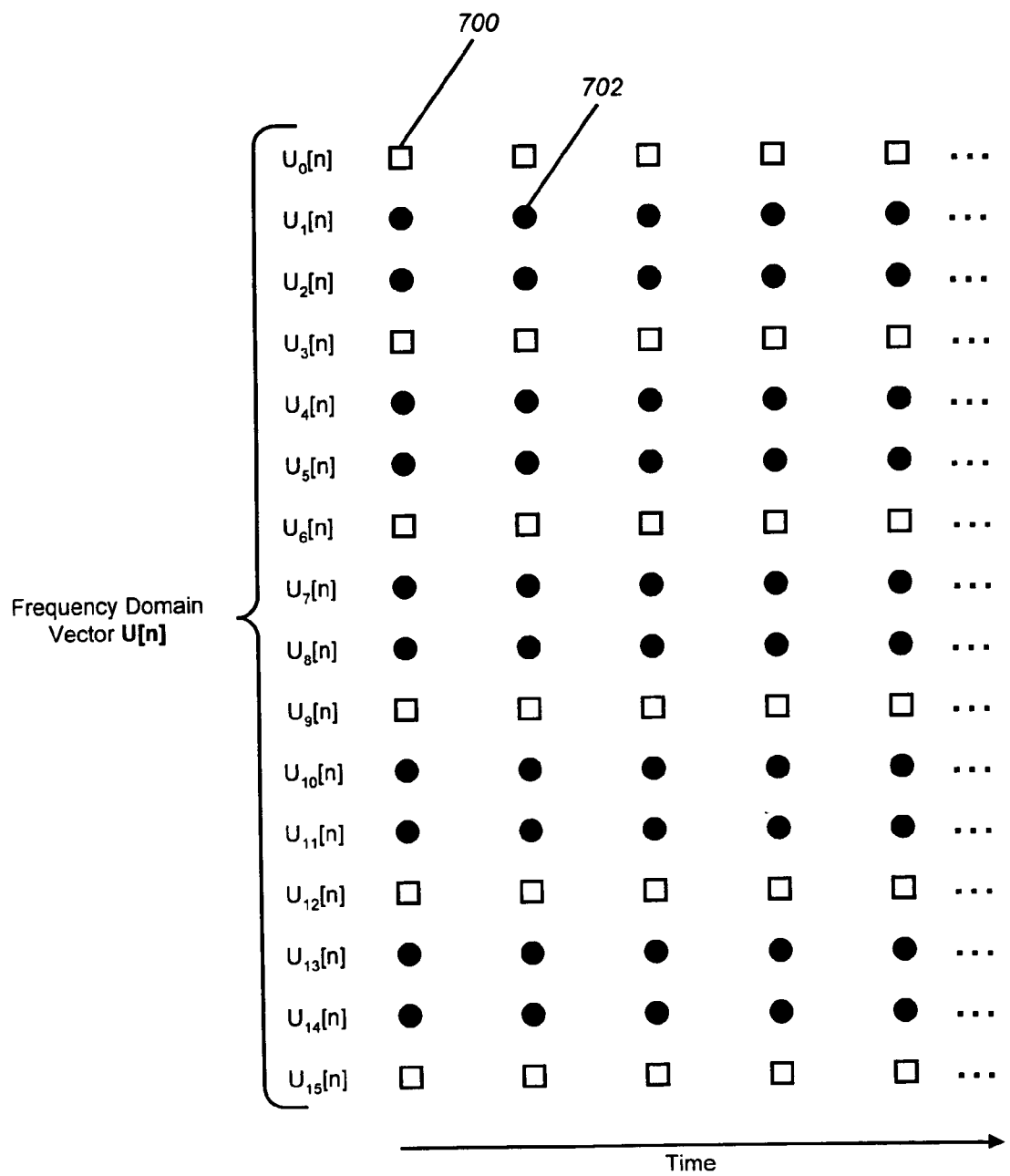
FIG. 9 illustrates an exemplary time-frequency lattice showing a segment of a frequency-domain vector sequence output by a buffer within the OFDM subcarrier modulator of FIG. 8.
Figure 10:
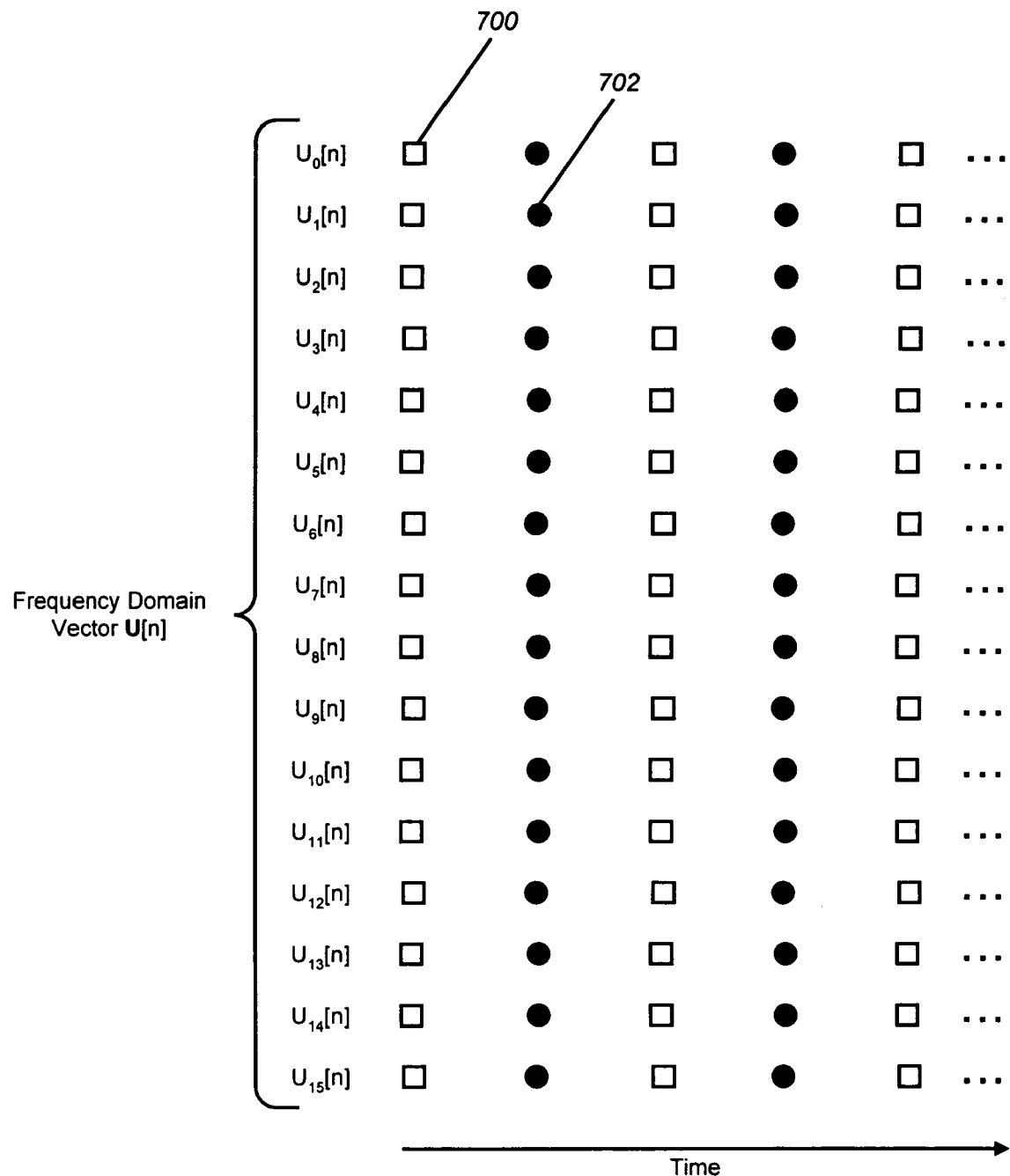
FIG. 10 illustrates another exemplary time-frequency lattice showing a segment of a frequency-domain vector sequence output by a buffer within the OFDM subcarrier modulator of FIG. 8.

FIG. 9 shows a segment of an exemplary vector sequence that may be output by buffer 39a if N was set to 15 and $M_{MUX}$ to 2. FIG. 10 shows a segment of another exemplary vector sequence that may appear at the output of buffer 39a if N was set to 15 and $M_{MUX}$ to 16. Within FIG. 9 and FIG. 10 each column contains a length-16 frequency-domain data vector U[n], and each row a segment of a frequency-domain subchannel signal sample $U_s[n]$, $s \in S_{16}$. Each square 700 represents a sample of the BPSK pilot signal and each filled circle 702 a sample of the M-QAM data signal.

Figure 11:
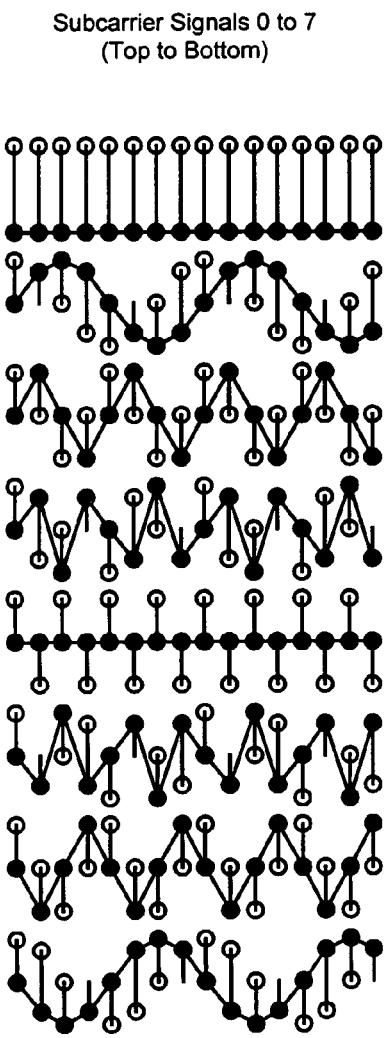
FIG. 11 illustrates an exemplary subcarrier signal set used to perform orthogonal subcarrier modulation.
Figure 11:
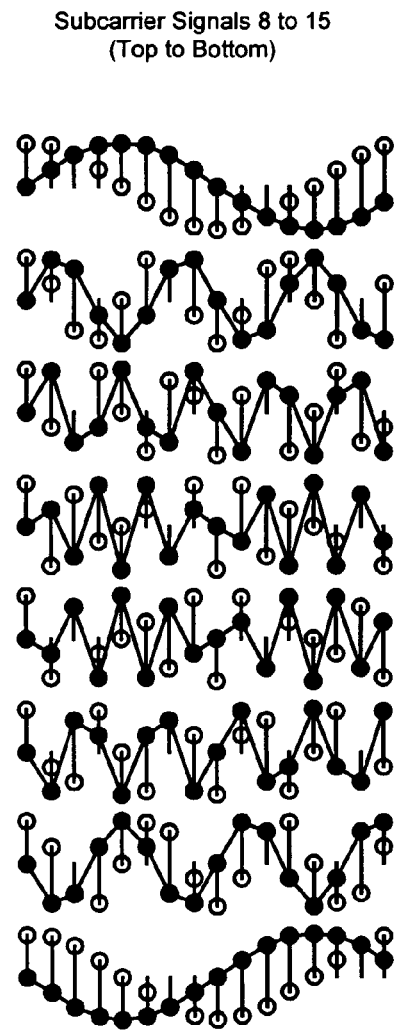

Returning to FIG. 8, block 39b of orthogonal subcarrier MOD 39 performs orthogonal subcarrier modulation by a matrix-vector multiplication using an inverse discrete Fourier transform (IDFT) matrix or equivalently a fast Fourier transform (IFFT) matrix and the vector U[n]. FIG. 11 shows the orthogonal subcarrier signals that comprise the rows of an example IDFT matrix (N=16). Rows of the IDFT matrix contain sixteen subcarrier signals that are equally spaced in frequency. Both the real and imaginary components of the subcarrier signals are shown.

Orthogonal subcarrier modulation transforms frequency-domain vector U[n] into a time-domain length-N OFDM symbol $$u[n] = \{u_s[n], s \in S_N\}.$$

Subchannel signal samples comprising the nth time-domain OFDM symbol are $$u_s[n] = \frac{E_S}{N} \sum_{j=(n-1)N}^{nN-1} U_{(j \bmod N)}[n] w_N^{(j \bmod N)k},$$

where $E_S$ denotes energy, $U_{(j \bmod N)}[n]$ denotes a frequency-domain sample of the BPSK pilot signal or M-QAM data signal, and $$w_N = \exp[i 2\pi/N] = \cos(2\pi/N) + i \sin(2\pi/N),$$

where $i = \sqrt{-1}$. By properties of the IDFT or IFFT matrix used to implement orthogonal subcarrier modulation, each time-domain data sample $u_s[n]$ in $u[n]$ will have a different subcarrier frequency. In particular, the sth subchannel $x_s[n]$ will have a frequency of $f_s = s/NT_S$.

Note also that after the nth time-domain OFDM symbol u[n] is transferred out of orthogonal subcarrier MOD 39, buffer 39a must be filled up again with frequency-domain vector U[n+1] and the transformation to OFDM symbol u[n+1] must again be executed by subcarrier block 39b.

A simple example is now provided to illustrate the operation of block 39b in FIG. 8. Suppose buffer 39a buffers N=4 consecutive samples output from MUX 35 of FIG. 7 so that the buffer contains a length 4 frequency-domain vector $$U[n] = \{U_s[n], s \in S_4\}.$$

Given U[n], block 39b then performs the matrix-vector multiplication u[n]=AU[n] where the matrix A is the inverse DFT matrix $$A = \frac{1}{N} \begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix}. \text{ Each } a_{jk} = w_N^{jk},$$

where $$w_N = \exp[i 2\pi/N] = \cos(2\pi/N) + i \sin(2\pi/N)$$

is an nth root of unity because $w_N^N = 1$. Block 39b outputs the time-domain OFDM data symbol $$u[n] = \{u_s[n], s \in S_4\},$$

where $$u_0[n]=a_{11}U_0[n]+a_{12}U_1[n]+a_{13}U_2[n]+a_{14}U_3[n]$$

$$u_1[n]=a_{21}U_0[n]+a_{22}U_1[n]+a_{23}U_2[n]+a_{24}U_3[n]$$

$$u_2[n]=a_{31}U_0[n]+a_{32}U_1[n]+a_{33}U_2[n]+a_{34}U_3[n]$$

$$u_3[n]=a_{41}U_0[n]+a_{42}U_1[n]+a_{43}U_2[n]+a_{44}U_3[n]$$

Each $u_k[n]$, $s \in S_4$, is a sample of a time-domain subchannel signal having a subcarrier frequency of $f_s=s/NT_S$ Hz. The matrix

|  | u[1] | u[2] | u[3] | u[4] |  |
|---|---|---|---|---|---|
| Time domain SCS 0: | $u_0[1]$ | $u_0[2]$ | $u_0[3]$ | $u_0[4]$ | ... |
| Time domain SCS 1: | $u_1[1]$ | $u_1[2]$ | $u_1[3]$ | $u_1[4]$ | ... |
| Time domain SCS 2: | $u_2[1]$ | $u_2[2]$ | $u_2[3]$ | $u_2[4]$ | ... |
| Time domain SCS 3: | $u_3[1]$ | $u_3[2]$ | $u_3[3]$ | $u_3[4]$ | ... | displays the subchannel signal samples associated with the first four time-domain OFDM symbols u[1], u[2], u[3] and u[4] of a transmitted OFDM symbol sequence. Each column contains a time-domain OFDM symbol. Each row contains four samples of a time-domain subchannel signal (SCS) having a frequency of $f_s=s/4T_S$ Hz, $s \in S_4$.

Returning to FIG. 7, guard interval insertion block 41 attaches a cyclic prefix and a cyclic suffix to each length-N time-domain OFDM symbol u[n] output from orthogonal subcarrier MOD 39. The cyclic prefix and suffix help mitigate inter-OFDM symbol interference. For example, let positive even integer $N_G$ be less than N/2. Each cyclic prefix is constructed using the last $N_G/2$ subchannel signal samples of time-domain OFDM symbol u[n]. Each cyclic suffix is constructed using the first $N_G/2$ subchannel signal samples of time-domain OFDM symbol u[n]. The length of the guard interval (cyclic prefix plus cyclic suffix) is greater than or equal to the length of the time delay spread of the channel.

Figure 12A:
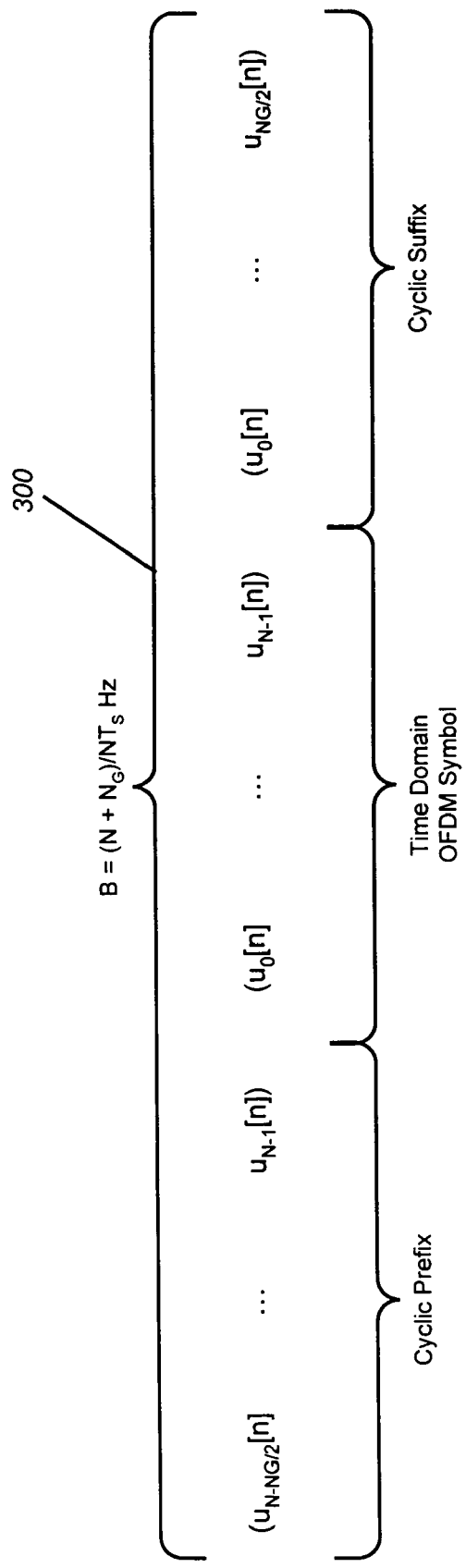
FIG. 12a illustrates an exemplary time-domain OFDM symbol cyclically extended by a cyclic prefix and suffix.
Figure 12B:
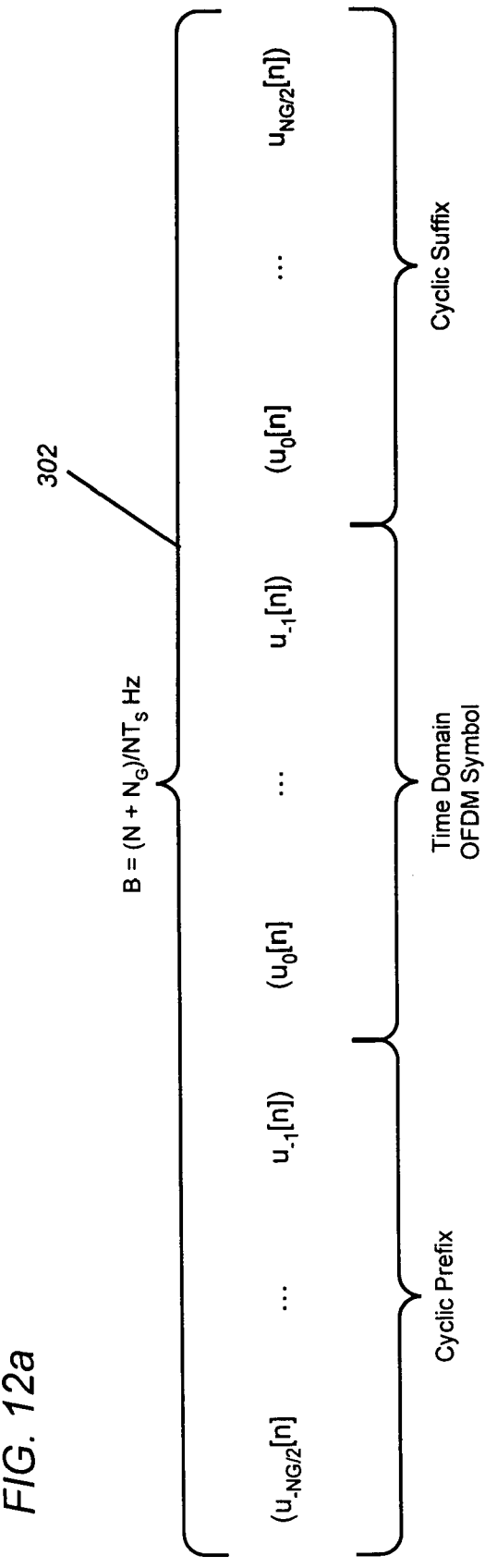
FIG. 12b illustrates the exemplary time-domain OFDM symbol of FIG. 12a extended by a cyclic prefix and suffix with a different indexing.

FIG. 12a shows the structure of a cyclically extended time-domain OFDM symbol 300 having a bandwidth of $B=(N+N_G)/NT_S$ Hz according to an embodiment of the present invention. Note that by periodicity the identity $u_{-s}[n]=u_{N-s}[n]$ holds, so subchannel signal samples shown in the cyclically extended time-domain OFDM symbol 300 of FIG. 10a can also be written to range from $u_{-N_G/2}[n]$ through $u_{N_G/2}[n]$. This is shown in cyclically extended time-domain OFDM symbol 302 of FIG. 12b in order to help clarify the adjective cyclic.

Referring again to FIG. 7, raised-cosine window block 43 spectrally shapes each cyclically extended time-domain OFDM symbol u[n] output from guard interval insertion block 41. The windowing operation assures that transmitted time-domain OFDM symbols are within an allocated channel bandwidth. The windowing operation only distorts the cyclic prefix and suffix of a cyclically extended time-domain OFDM symbol. The data portion of a time-domain OFDM symbol is unaffected.

Frame preamble source 47 produces a real- or complex-valued preamble signal that is known by all transmitters and receivers within an OFDM communications system. Typically, the known preamble signal has statistical properties similar to uncorrelated white noise. To produce a cyclically extended and spectrally shaped time-domain OFDM preamble symbol, the preamble signal is first modulated by orthogonal subcarrier MOD 49, next cyclically extended by guard interval insertion block 51 and then spectrally shaped by raised-cosine window block 53. The procedure and parameters to produce a time-domain OFDM preamble symbol are identical to those to produce a time-domain OFDM data symbol u[n] as described above.

To distinguish between time-domain length-N OFDM data symbols u[n] and time-domain OFDM preamble symbols, the nth time-domain OFDM preamble symbol is denoted $$x[n]=\{x_s[n], s \in S_N\}.$$

Subchannel signal samples comprising the nth time-domain OFDM preamble symbol are $$x_s[n] = \frac{E_S}{N} \sum_{j=(n-1)N}^{nN-1} X_{(j \bmod N)}[n] w_N^{(j \bmod N)k},$$

where $E_S$ denotes energy, $X_{(j \bmod N)}[n]$ denotes a frequency-domain sample of the known preamble signal produced by block 47 and $$w_N = \exp[i2\pi/N] = \cos(2\pi/N) + i \sin(2\pi/N),$$

where $i=\sqrt{-1}$. By properties of the IDFT or IFFT matrix used to implement orthogonal subcarrier modulation, each time-domain preamble sample $x_s[n]$ in x[n] will have a different subcarrier frequency. In particular, the sth subchannel $x_s[n]$ will have a frequency of $f_s=s/NT_S$. Note that OFDM preamble and data symbols are produced in an identical manner and will therefore be corrupted by a channel in an identical manner if the channel characteristics are the same during transmission of the two symbols.

Framer 45 first constructs an OFDM packet by concatenating a specified number of consecutive cyclically extended and spectrally shaped time-domain OFDM data symbols such as u[n]. Framer 45 then attaches a time-domain OFDM preamble symbol x[n] to the constructed OFDM packet to construct an OFDM frame. Note that the invention allows more than one time-domain OFDM preamble symbol to be used to construct a preamble. Framer 45 then sequentially outputs samples in the constructed frame at rate $1/T_S$ beginning with the left-most sample of the time-domain OFDM preamble symbol.

Figure 3:
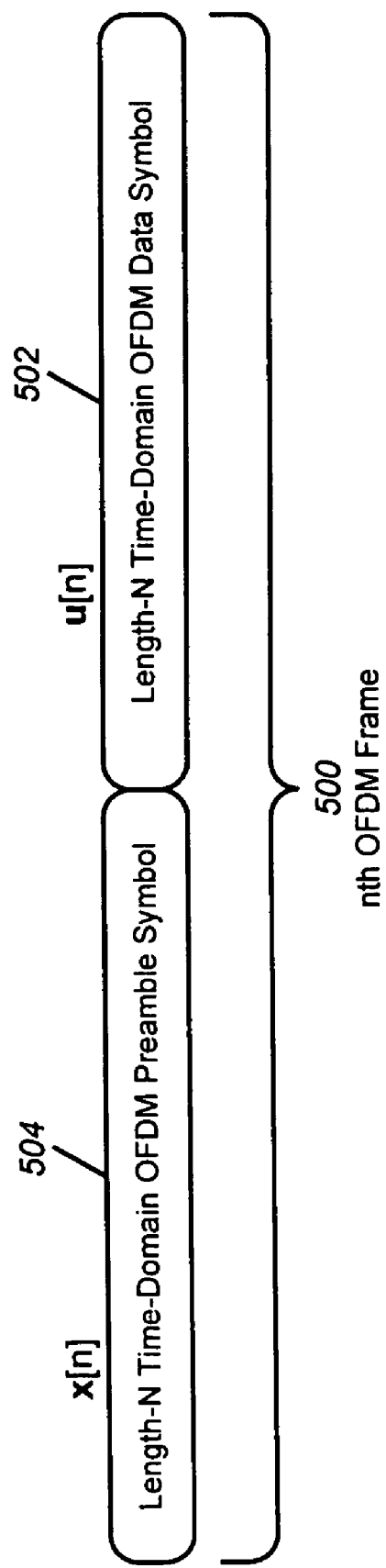
FIG. 3 illustrates an exemplary structure for an OFDM frame transmitted within an OFDM communications system.
Figure 4:
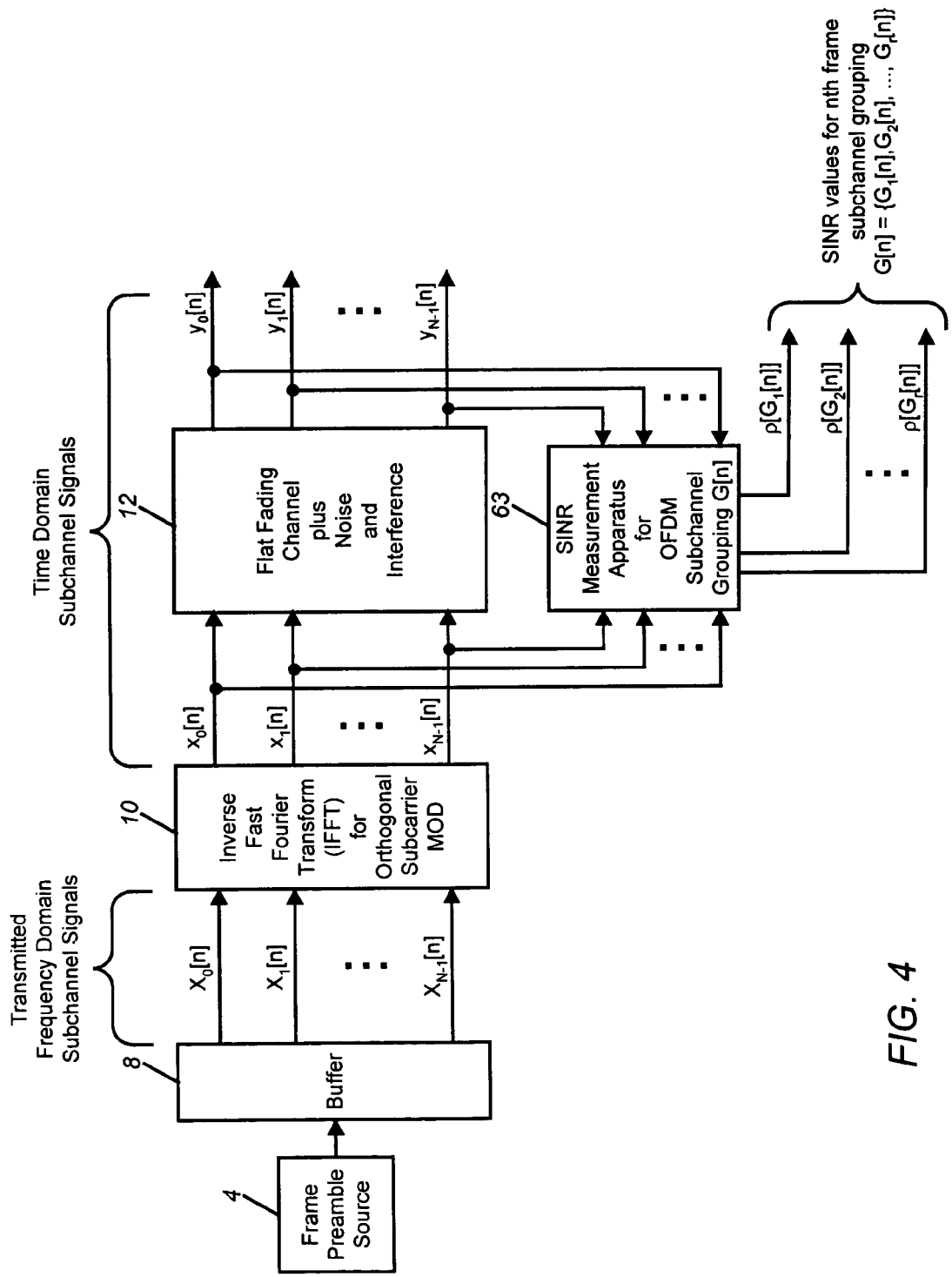
FIG. 4 is a top-level conceptual model of a baseband OFDM communications system according to an embodiment of the present invention.

FIG. 3 shows an exemplary OFDM frame that will be used for the invention description. The exemplary OFDM frame 500 is comprised of a cyclically extended and spectrally shaped time-domain OFDM preamble symbol 504 and a cyclically extended and spectrally shaped time-domain OFDM data symbol 502. It must be emphasized that the preamble 504 is known by all OFDM receivers within an OFDM communications system. The preamble is commonly used as a reference signal to aid in detection and estimation within an OFDM receiver. For example, an OFDM receiver may use a known preamble for channel estimation, automatic gain control, carrier synchronization, and symbol timing synchronization. Embodiments of the present invention may use the known preamble for SINR measurement of OFDM subchannel signals.

Referring again to FIG. 7, each frame sample sequentially output by framer 45 is corrupted by time-varying multipath channel block 55. Channel parameters associated with block 55 such as signal path attenuations and gains, signal path propagation delays, Doppler frequency spread, Ricean K-factor are assumed to be constant over a frame time interval. That is, for the present invention to operate optimally, channel parameters must vary slower than the frame rate.

Blocks 57 and 59 add samples from an interference-plus-noise (IPN) signal to channel corrupted frame output samples from block 55. The unknown time-varying IPN signal is due to other transmitters concurrently transmitting over the same channel. The IPN signal can have any time-varying continuous probability distribution because the disclosed method utilizes nonparametric signal processing based on FFT computations. Again, for the present invention to operate optimally the time-varying IPN signal must vary slower than the frame rate.

The receive operations of the OFDM communications system of FIG. 7 will now be described. It must be first mentioned that three time and frequency synchronization tasks must be performed within an OFDM receiver.

First, in order to properly demodulate OFDM symbols from received OFDM frames, an OFDM receiver must determine the exact timing of the beginning of each OFDM symbol within a received OFDM frame. If correct OFDM symbol timing is not known, the receiver will not be able to reliably remove the guard interval (cyclic prefix and suffix) and correctly isolate individual OFDM preamble and data symbols before demodulating them. Without correct OFDM symbol timing, sequences of data demodulated from a received OFDM signal will generally be incorrect, and the transmitted data will not be accurately recovered.

The second synchronization task is that of determining and correcting for carrier frequency offset. Ideally, the receive carrier frequency should exactly match the transmit carrier frequency. If this condition is not met, however, the mismatch contributes to a non-zero carrier frequency offset in the received OFDM signal. OFDM signals are very susceptible to such carrier frequency offset which results in a loss of orthogonality between OFDM subcarrier signals, inter-subcarrier interference and a severe increase in the BER of the recovered data at the receiver.

The third synchronization task is that of synchronizing an OFDM transmitter's sample rate to the OFDM receiver's sample rate in order to eliminate sampling rate offset. Any mismatch between these two sampling rates results in a phase rotation of the signal constellation from OFDM symbol to symbol within a received OFDM frame. Uncorrected sampling frequency offset can contribute to increased BER.

All of the above three time and frequency synchronization tasks, well-understood by those skilled in the art, are assumed to be implemented within an embodiment of the present invention. However, for purposes of simplifying the invention description, time and frequency synchronization blocks are not shown in FIG. 7.

Assuming time and frequency synchronization, de-framer 61 of FIG. 7 extracts the OFDM preamble symbol and the OFDM data symbol from each received OFDM frame (see FIG. 3). The cyclically extended OFDM preamble symbol is then passed to guard interval removal block 62 which extracts and discards the length-$N_G$ guard interval (cyclic prefix and suffix). The resulting received time-domain OFDM preamble symbol is input to SINR measurement apparatus 63. Note that the OFDM data symbol is not required for the disclosed method. Blocks 67 through 77, which process the OFDM data symbol, are only shown for reference and extension of embodiments of the present invention.

The corrupted length-N time-domain OFDM preamble symbol at the input to SINR measurement apparatus 63 is $$y[n]=\{y_s[n], s \in S_N\},$$

where the sth sample in y[n] is $$y_s[n]=h_s[n]x_s[n]+v_s[n].$$

Here, s denotes the subchannel number in $S_N$, $h_s[n]$ a complex-valued sample of an unknown time-varying channel process associated with channel block 55, $x_s[n]$ a known preamble input sample from x[n], and $v_s[n]$ an unknown sample of the IPN process produced by block 57. The time-varying probability distribution of the channel process and the IPN signal can be any continuous distribution. Note that due to guard interval insertion by block 51, inter-OFDM symbol interference is not present and the channel is modeled as a flat fading channel.

The SINR Measurement Method

FIG. 3 shows an exemplary OFDM frame 500 comprised of a single cyclically extended and spectrally shaped time-domain OFDM preamble symbol 504 and a single cyclically extended and spectrally shaped time-domain OFDM data symbol 502. For the nth frame, the OFDM preamble is denoted x[n] and the OFDM data symbol as u[n]. To simplify the invention description a frame comprised only of x[n] and u[n] will used. However, it must be stated that the invention can be utilized for any frame structure as long as the frame has a known preamble or any other segment of known symbols occurring at some location within the frame. For purposes of simplifying the disclosure, this segment of known symbols shall be referred to herein as a preamble, even though the segment may occur in the middle or at the end of a frame.

For the nth OFDM frame, a subchannel grouping or set partition of subchannel vector $S_N$ for integer $0 \leq r \leq N$ is $$G[n]=\{G_0[n], G_1[n], \ldots, G_{r-1}[n]\}.$$

Subchannel grouping G[n] contains r distinct subchannel groups $G_0[n], G_1[n], \ldots, G_{r-1}[n]$ which are disjoint subsets of $S_N$. The ith subchannel group $G_i[n]$ consists of $N_i$ subchannels. The equality $$N_0+N_1+\ldots+N_{r-1}=N$$

must be true for a specified subchannel grouping. The total number of possible subchannel groupings of $S_N$ is given by the multinomial coefficient $$C(N, N_0, \ldots, N_{r-1}) = \frac{N!}{N_0! N_1! \ldots N_{r-1}!}.$$

Figure 5:
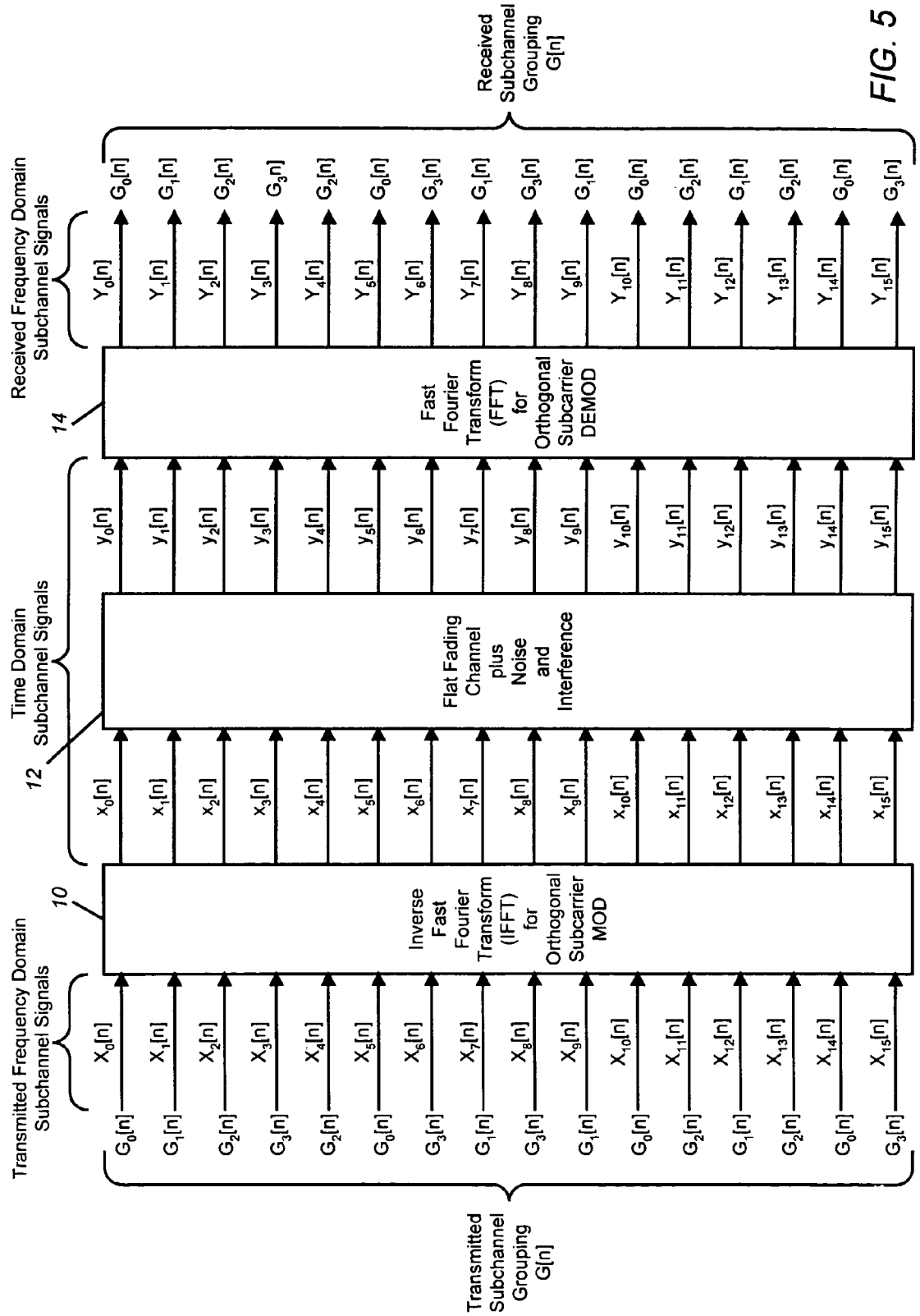
FIG. 5 illustrates an exemplary subchannel grouping associated with the nth transmitted frame in OFDM frame sequence.

FIG. 5 shows an exemplary OFDM system subchannel grouping G[n] for the nth transmitted frame, wherein N=r=4 and $$G[n]=\{G_0[n], G_1[n], G_2[n], G_3[n]\},$$

and where $$G_0[n]=\{0,5,10,14\}$$

$$G_1[n]=\{1,7,9,12\}$$

$$G_2[n]=\{2,4,11,13\}$$

$$G_3[n]=\{3,6,8,15\}.$$

Figure 6:
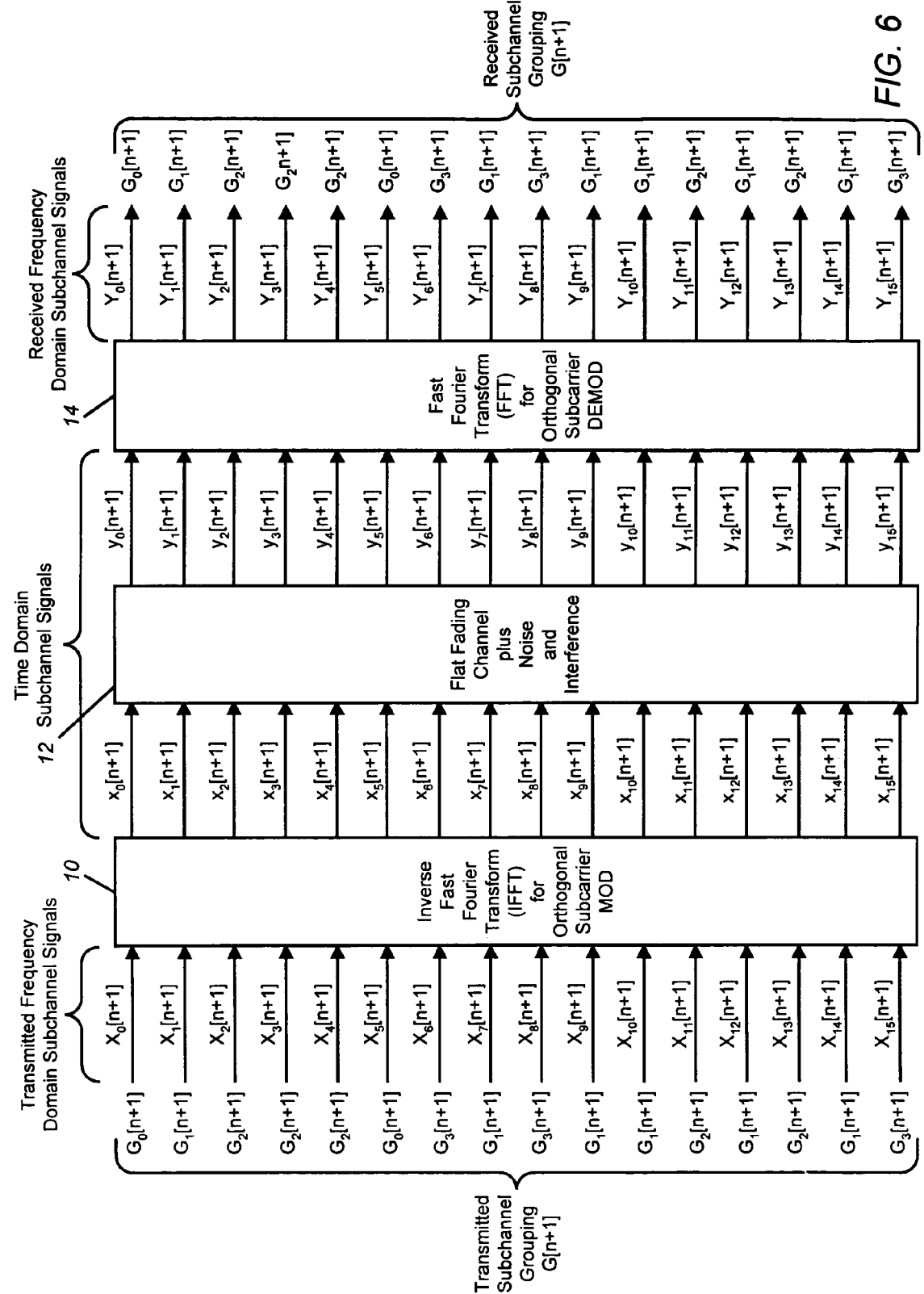
FIG. 6 illustrates the an exemplary subchannel grouping associated with the (n+1)th transmitted frame in OFDM frame sequence.

Subchannel groups may vary in size frame-by-frame. FIG. 6 shows an exemplary OFDM system subchannel grouping G[n+1] for the (n+1)th transmitted frame, wherein N=r=4 and $$G_0[n+1]=\{0,5\}$$

$$G_1[n+1]=\{7,9,10,12,14\}$$

$$G_2[n+1]=\{2,3,4,11,13\}$$

$$G_3[n+1]=\{6,8,15\}.$$

For each transmitted frame, a subchannel group G[n] may be formed by permuting subchannel vector $S_N$ and then set partitioning the resulting permutation set into subchannel groups $G_i[n]$. For example, the permutation $$\{0,5,1,7,9,10,12,14,2,3,4,11,13,6,8,15\}$$

of $S_{16}$ can be partitioned to produce the subchannel groups $G_0[n+1]$, $G_1[n+1]$, $G_2[n+1]$, and $G_3[n+1]$ listed above. Hence a subchannel grouping G[n] is formed by a permutation of set $S_N$ followed by a set partitioning of the resulting permutation set. The permutation map can be implemented easily using an interleaver.

Figure 13A:
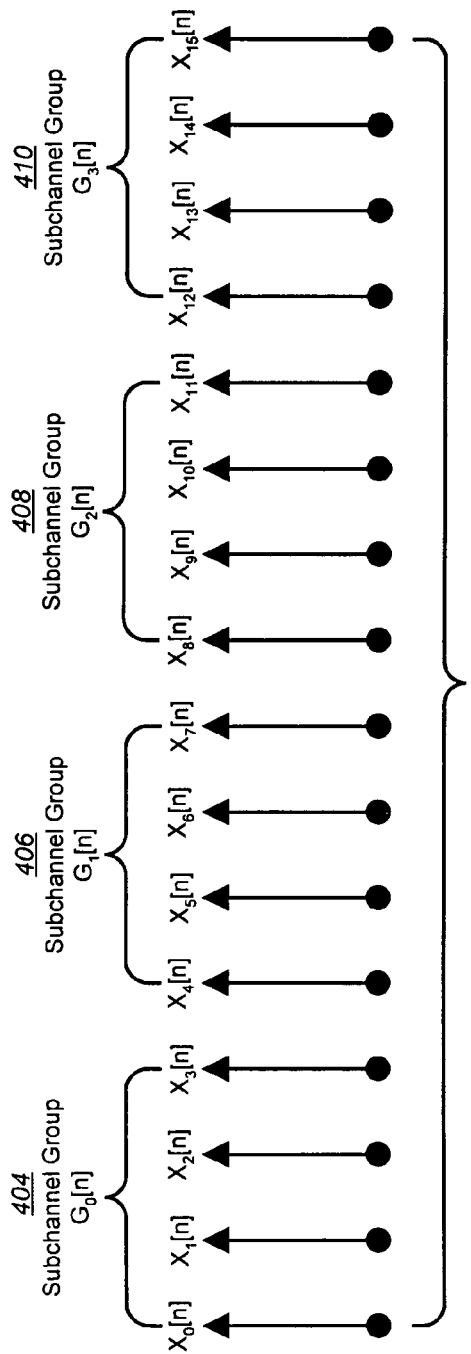
FIG. 13a illustrates the power spectral density of an exemplary transmitted frequency-domain vector.

FIG. 13a shows a simple example of the power spectral density (PSD) 402 of a transmitted OFDM preamble x[n] that may be observed at the output of frame preamble source 47 within FIG. 7. Within FIG. 13a, PSD measurements 402 are partitioned into subchannel groups 404, 406, 408 and 410 defined as $$G_0[n]=\{0,1,2,3\}$$

$$G_1[n]=\{4,5,6,7\}$$

$$G_2[n]=\{8,9,10,11\}$$

$$G_3[n]=\{12,13,14,15\}.$$

Figure 13B:
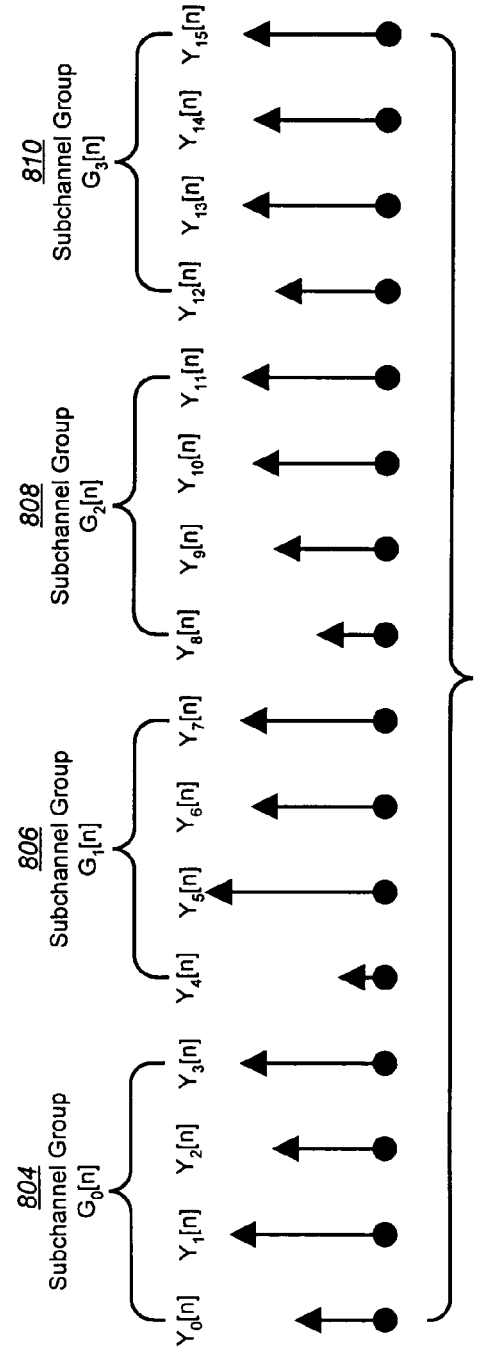
FIG. 13b illustrates the power spectral density of an exemplary received frequency-domain vector.

Because transmitted time-domain subchannel signals have different frequencies, they will be corrupted by channel block 55 and IPN block 57 of FIG. 7 differently. Hence, the PSD of a received OFDM preamble y[n] may appear as 802 within FIG. 13b. Observe that because of channel block 55 and IPN block 57, the PSD of each received subchannel group (804, 806, 808, 810) is corrupted differently. Embodiments of the present invention permit individual SINR measurements for subchannel signals associated any specified subchannel grouping G[n].

Figure 14:
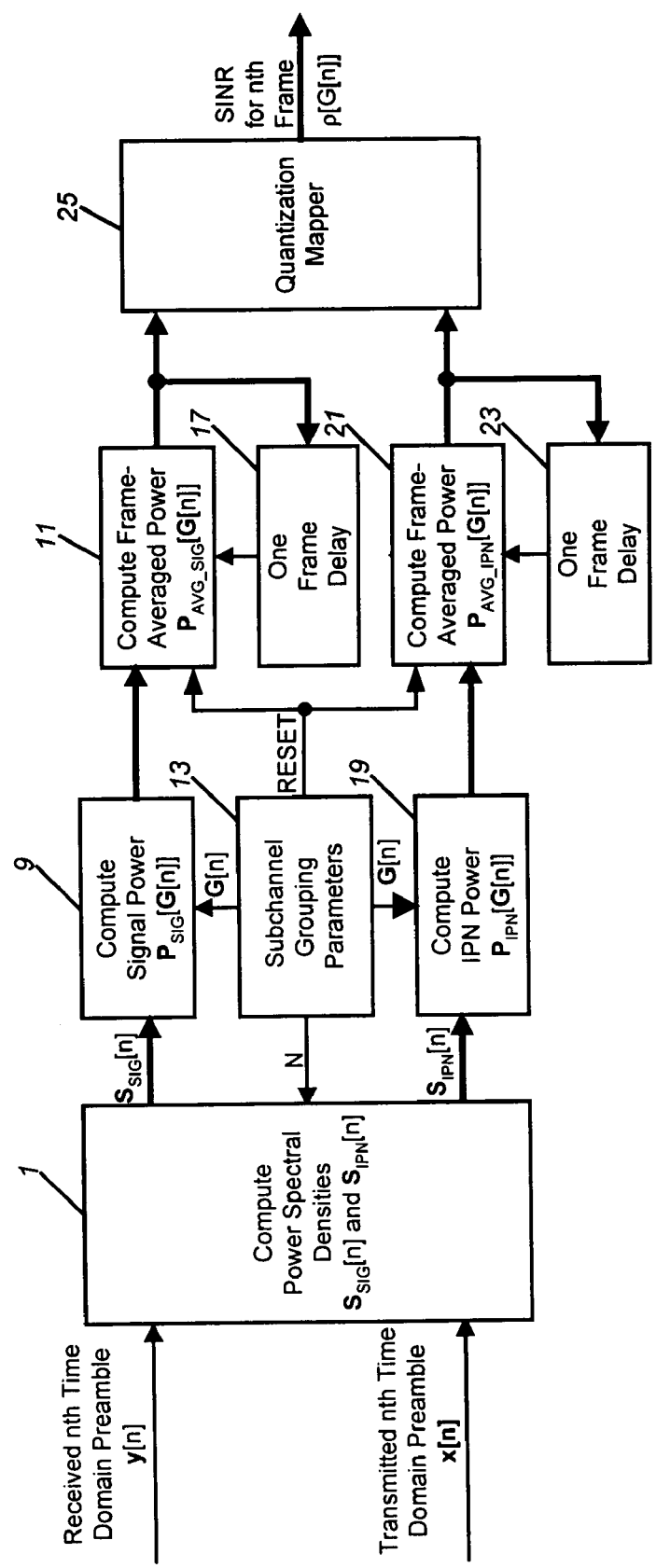
FIG. 14 illustrates a functional block diagram of an SINR measurement apparatus for OFDM subchannel signals according to an embodiment of the present invention.

FIG. 14 shows the detail of SINR measurement apparatus 63 of FIG. 7. SINR measurement apparatus 63 receives operating parameters from block 13 of FIG. 13. Specifically, for the nth frame, the subchannel grouping G[n] as described above and the total number N of subchannels are output from block 13. Subchannel grouping G[n] is input to blocks 9 and 19 in order specify for which subchannel groups SINR values are to be computed. Parameter N is input to block 1, which uses the parameter to configure itself for computing power spectral density vectors $S_{SIG}[n]$ and $S_{IPN}[n]$. Block 13 also outputs a RESET bit to reset blocks 11 and 21 when required. These subchannel grouping parameters control the operation of SINR measurement apparatus 63 on a frame-by-frame basis and will be described in more detail in the following paragraphs.

First, given N from block 13, the transmitted time-domain preamble x[n], and the received time-domain preamble y[n], block 1 of FIG. 14 computes power spectral density (PSD) vectors $$S_{xx}[n]=\{S_{xx}[n,s], s \in S_N\}$$

$$S_{yy}[n]=\{S_{yy}[n,s], s \in S_N\}$$

and $$S_{xy}[n]=\{S_{xy}[n,s], s \in S_N\}.$$

Figure 15:
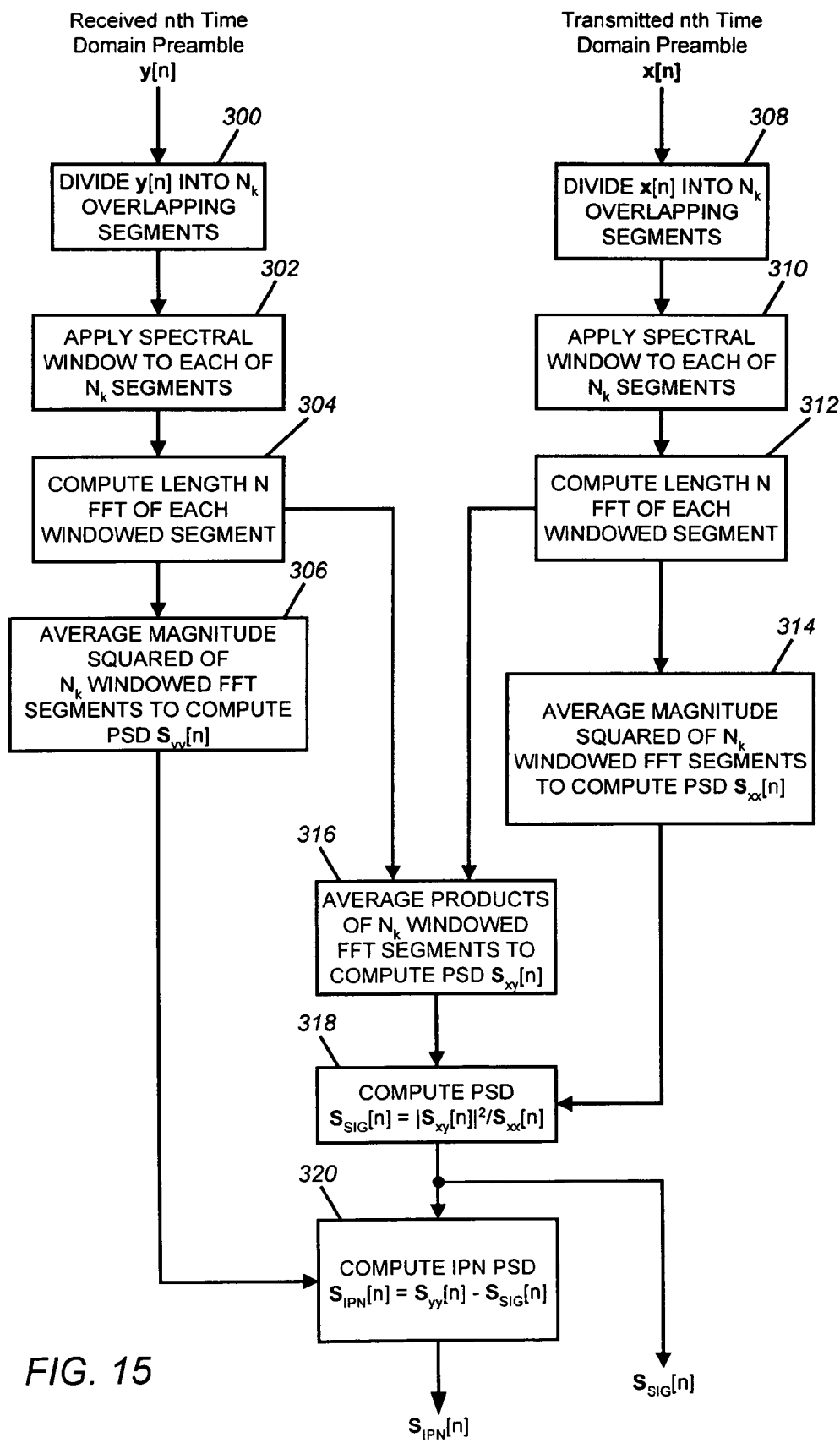
FIG. 15 illustrates a flowchart for power spectral density computation within the functional block diagram of FIG. 14 according to an embodiment of the present invention.

FIG. 15 shows a flowchart of the preferred method for computing $S_{xx}[n]$, $S_{yy}[n]$ and $S_{xy}[n]$. The preferred method for computation of the PSD measurements is an FFT-based method introduced by P. D. Welch, "The Use of Fast Fourier Transform for the Estimation of Power Spectra: A Method Based on Time Averaging Over Short, Modified Periodograms." IEEE Trans. Audio Electroacoustics. Vol. AU-15 (June 1967). pp. 70-73. Referring to the flowchart in FIG. 15, the steps to compute the above PSD vectors will now be described.

In step 308, a known length-N OFDM time-domain preamble symbol x[n] produced by orthogonal subcarrier MOD 49 of FIG. 7 is divided into $N_K$ overlapping vectors of length $N_L$. The $N_K$ overlapping vectors are overlapped by $N_P < N_L$ samples. For example, if $N_L = 4$, $N_P = 2$ and $$x[n]=\{1,2,3,4,5,6,7,8\},$$

then $$x_1[n]=\{1,2,3,4\}$$

$$x_2[n]=\{3,4,5,6\}$$

$$x_3[n]=\{5,6,7,8\}$$

are the $N_K=3$ overlapping vectors produced by step 308. Note that the final $N_P$ samples of each overlapping vector are repeated at the beginning of the following overlapping vector. The equality $$N_K = \frac{N - N_P}{N_L - N_P}$$

and inequalities $N_L \leq N$ and $N_P < N_L$ must be true for step 308 to perform the division into overlapping vectors. The number of overlapping vectors selected affects the desired balance between the resolution and variance of the PSD measurements. A preferred embodiment utilizes an overlap of 50% as shown in the vectors $x_1[n]$, $x_2[n]$ and $X_3[n]$ above.

In step 310 a spectral window is applied to each of the $N_K$ overlapping vectors produced by step 308. The purpose of the spectral window is to help control the tradeoff between bias and variance of the PSD measurements. The spectral window chosen may be any desired type; however, the preferred embodiment utilizes a Hamming (raised cosine) window. Although overlap between vectors produced by the segmentation of step 308 introduces redundant signal samples, this effect is diminished by the use of a nonrectangular Hamming window in step 310. In particular, the Hamming window reduces the importance given to the end samples of segment vectors (i.e., the samples that overlap).

In step 312 a length-N fast Fourier transform operation is applied to each of the $N_K$ length-$N_L$ windowed vectors produced by block 310. Since the length of the windowed vectors is $N_L \leq N$ the windowed vectors may need to be padded with zeros so that their lengths are equal to N.

In step 314 the magnitude squared of each FFT vector (i.e. the periodogram) from step 312 is computed. The squared magnitudes of the $N_K$ FFT vectors are then averaged to produce vector $S_{xx}[n]$. Each PSD measurement $S_{xx}[n,s]$ in $S_{xx}[n]$ gives a measure of the proportion of total transmit signal power allocated to time-domain subchannel signal sample $x_s[n]$ in $x[n]$. Averaging of the $N_K$ FFT vectors decreases the variance of each PSD measurement. However, the combined use of short segment vectors and Hamming windows results in reduced resolution of the PSD measurements. Hence, there is a tradeoff between variance reduction and resolution. The parameters may be optimized in the method to obtain improved PSD measurements.

In steps 300, 302, 304 and 306 the exact same operations are performed as steps 308, 310, 312 and 314, but the received time-domain OFDM preamble symbol y[n] output from block 62 of FIG. 7 is used as input instead of x[n]. The output produced by block 306 is the vector $S_{yy}[n]$. Each PSD measurement $S_{yy}[n,s]$ in $S_{yy}[n]$ gives a measure of the total received signal power allocated to time-domain subchannel signal sample $y_s[n]$ in $y[n]$.

In step 316 the complex-conjugates of the $N_K$ length-N FFT vectors produced by step 304 and $N_K$ length-N FFT vectors produced by step 312 are multiplied together and then averaged to produce the vector $S_{xy}[n]$. Each $S_{xy}[n,s]$ in $S_{xy}[n]$ gives a measure of the proportion of total received signal power associated with the product $x_s[n]y_s[n]$.

In step 318 the received signal PSD vector $$S_{SIG}[n]=\{S_{SIG}[n,s], s \in S_N\}$$

is computed, where $$S_{SIG}[n,s] = \frac{|S_{xy}[n,s]|^2}{S_{xx}[n,s]}$$

is an estimate of the portion of total received signal power allocated to the product $h_s[n]x_s[n]$.

In step 320 the received interference-plus-noise PSD vector $$S_{IPN}[n]=\{S_{IPN}[n,s], s \in S_N\}$$

is computed, where $$S_{IPN}[n,s]=S_{yy}[n,s]-S_{SIG}[n,s]$$

quantifies the portion of total received signal power allocated to the unknown IPN subchannel signal sample $v_s[n]$.

It must be mentioned before proceeding that because x[n] is a known OFDM preamble symbol, steps 308, 310, 312 and 314 can be computed "off-line" in order to reduce computation time. The computed values can be stored in random access memory (RAM) and be read quickly from RAM when needed. Thus, only steps 300, 302, 304, 306, 316, 318 and 320 need to be computed for each received frame.

Returning to FIG. 14, given a subchannel grouping G[n] from block 13 and received signal PSD vector $S_{SIG}[n]$ from block 1, block 9 computes the received average signal power vector $$P_{SIG}[G[n]]=\{P_{SIG}[G_i[n]], i=0, \ldots, r-1\},$$

where $$P_{SIG}[G_i[n]] = 10\log_{10}\left(\frac{1}{NT_S}\sum_{s \in G_i[n]} S_{SIG}[n,s]\right).$$

The total received signal power for the nth frame is $$P_{SIG}[n] = \frac{1}{NT_S}\left(\sum_{s \in G_0[n]} S_{SIG}[n,s] + \sum_{s \in G_1[n]} S_{SIG}[n,s] + \ldots + \sum_{s \in G_{r-1}[n]} S_{SIG}[n,s]\right),$$

so $P_{SIG}[G_i[n]]$ is the average received signal power for subchannel group $G_i[n]$ in G[n]. The logarithmic operation lessens the variance of received signal power measurement $P_{SIG}[G_i[n]]$.

Given $P_{SIG}[G[n]]$, blocks 11 and 17 compute the frame-averaged received signal power vector $$P_{AVG\_SIG}[G[n]]=\{P_{AVG\_SIG}[G_i[n]], i=0, \ldots, r-1\},$$

where $$P_{AVG\_SIG}[G_i[n]]=P_{AVG\_SIG}[G_i[n-1]]+\beta(P_{SIG}[G_i[n]]-P_{AVG\_SIG}[G_i[n-1]])$$

is an exponentially smoothed measurement of average received signal power associated with subchannel group $G_i[n]$ in G[n]. Real value $0<\beta \leq 1$ is a smoothing parameter. The recursion for $P_{AVG\_SIG}[G[n]]$ is initialized by setting $P_{AVG\_SIG}[G_i[1]]=P_{SIG}[G_i[1]]$. Initialization occurs each time a RESET command is received from block 13.

Given a subchannel grouping G[n] from block 13 and received IPN PSD vector $S_{IPN}[n]$ from block 1, block 19 computes the average IPN power vector $$P_{IPN}[G[n]]=\{P_{IPN}[G_i[n]], i=0, \ldots, r-1\},$$

where $$P_{IPN}[G_i[n]] = 10\log_{10}\left(\frac{1}{NT_S}\sum_{s \in G_i[n]} S_{IPN}[n,s]\right).$$

The total received IPN power for the nth frame is $$P_{IPN}[n] = \frac{1}{NT_S}\left(\sum_{s \in G_0[n]} S_{IPN}[n,s] + \sum_{s \in G_1[n]} S_{IPN}[n,s] + \ldots + \sum_{s \in G_{r-1}[n]} S_{IPN}[n,s]\right),$$

so $P_{IPN}[G_i[n]]$ is the average received IPN power for subchannel group $G_i[n]$ in G[n]. The logarithmic operation lessens the variance of received IPN power measurement $P_{IPN}[G_i[n]]$.

Given $P_{IPN}[G[n]]$, blocks 21 and 23 compute the frame-averaged IPN power vector $$P_{AVG\_IPN}[G[n]]=\{P_{AVG\_IPN}[G_i[n]], i=0, \ldots, r-1\},$$

where $$P_{AVG\_IPN}[G_l[n]] = P_{AVG\_IPN}[G_l[n-1]] + \alpha(P_{IPN}[G_l[n]] - P_{AVG_{IPN}}[G_l[n-1]])$$

is an exponentially smoothed measurement of average IPN power associated with subchannel group $G_l[n]$ in $G[n]$. Real value $0 < \alpha \leq 1$ is a smoothing parameter. The recursion for $P_{AVG\_IPN}[G_l[n]]$ is initialized by setting $P_{AVG\_IPN}[G_l[1]] = P_{IPN}[G_l[1]]$. Initialization occurs each time a RESET command is received from block 13.

Finally, given $P_{AVG\_SIG}[n]$ and $P_{AVG\_IPN}[n]$ from blocks 11 and 21, block 25 computes the SINR vector $$\rho[G[n]] = \{\rho[G_l[n]], i=0, \ldots, r-1\},$$

where $$\rho[G_l[n]] = Q(P_{AVG\_SIG}[G_l[n]] - P_{AVG\_IPN}[G_l[n]])$$

is a quantized measurement of SINR for subchannel group $G_l[n]$ in $G[n]$. Q denotes any desired uniform or non-uniform quantization function. Thus, for the nth received frame an embodiment of the invention provides a quantized SINR measurement vector $\rho[G[n]]$ for subchannel signals associated with a specified subchannel grouping $G[n]$.

It should be understood that the averaging functions performed in blocks 11, 17, 21 and 23 are optional. In one embodiment of the present invention, the output of block 9 ($P_{SIG}[G[n]]$) and the output of block 19 ($P_{IPN}[G[n]]$) are used directly by block 25 to compute the SINR vector $$\rho[G[n]] = \{\rho[G_l[n]], i=0, \ldots, r-1\},$$

where $$\rho[G_l[n]] = Q(P_{SIG}[G_l[n]] - P_{IPN}[G_l[n]]).$$

In other embodiments, either blocks 11 and 17 or blocks 21 and 23 may be used to compute $\rho[G[n]]$, wherein $$\rho[G_l[n]] = Q(P_{AVG\_SIG}[G_l[n]] - P_{IPN}[G_l[n]]) \text{ or}$$

$$\rho[G_l[n]] = Q(P_{SIG}[G_l[n]] - P_{AVG\_IPN}[G_l[n]]), \text{ respectively.}$$

It should be understood that the basic concept of a fast-Fourier transform (FFT)-based SINR measurement method is applicable to any communications system that supports FFT processing such as, for example, a single-carrier communications system that utilizes FFT-based signal processing.

Although the present invention has been fully described in connection with the accompanying drawings, it is to be noted that various changes and modifications will become apparent to those skilled in the art. Such changes and modifications are to be understood as being included within the scope of the present invention as defined by the appended claims.

What is claimed is:

1. In a frame-based communications system utilizing orthogonal frequency division multiplexing (OFDM) and OFDM frames for multicarrier data transmission, each transmitted OFDM frame constructed from multiple time-domain OFDM symbols, one of the OFDM symbols being a known OFDM preamble, a method for measuring a signal to interference-plus-noise power ratio (SINR) for selected OFDM subchannel signals within the multicarrier data transmission to indicate channel quality and to adaptively adjust groupings of the OFDM subchannel signals to increase network capacity, the method comprising the steps of:

computing a power spectral density (PSD) measurement vector $S_{yy}[n]$ from an OFDM preamble y[n] received in an nth OFDM frame;

computing a PSD measurement vector $S_{xx}[n]$ from an OFDM preamble x[n] transmitted in the nth OFDM frame;

computing a cross-PSD measurement vector $S_{xy}[n]$ between x[n] and y[n] for the nth OFDM frame;

computing a PSD measurement vector $S_{SIG}[n]$ for the nth OFDM frame using $S_{xx}[n]$ and $S_{xy}[n]$;

computing a PSD measurement vector $S_{IPN}[n]$ for the nth OFDM frame using $S_{yy}[n]$ and $S_{SIG}[n]$;

specifying a subchannel grouping vector G[n] for the nth OFDM frame;

computing a received signal power measurement vector $P_{SIG}[G[n]]$ for the subchannel grouping vector G[n] using $S_{SIG}[n]$;

computing a received IPN power measurement vector $P_{IPN}[G[n]]$ for the subchannel grouping vector G[n] using $S_{IPN}[n]$; and computing a received SINR measurement vector $\rho[G[n]]$ for the subchannel grouping vector G[n] using $P_{SIG}[G[n]]$ and $P_{IPN}[G[n]]$.

2. The method as recited in claim 1, wherein the received signal power measurement vector $P_{SIG}[G[n]]$ is computed as a frame-averaged received signal power measurement vector $P_{AVG\_SIG}[G[n]]$ for the subchannel grouping vector G[n].

3. The method as recited in claim 1, wherein the received IPN power measurement vector $P_{IPN}[G[n]]$ is computed as a frame-averaged received IPN power measurement vector $P_{AVG\_IPN}[G[n]]$ for the subchannel grouping vector G[n].

4. The method as recited in claim 1:

wherein the received signal power measurement vector $P_{SIG}[G[n]]$ is computed as a frame-averaged received signal power measurement vector $P_{AVG\_SIG}[G[n]]$ for the subchannel grouping vector G[n]; and wherein the received IPN power measurement vector $P_{IPN}[G[n]]$ is computed as a frame-averaged received IPN power measurement vector $P_{AVG\_IPN}[G[n]]$ for the subchannel grouping vector G[n].

5. The method as recited in claim 1, further comprising quantizing the received SINR measurement vector $\rho[G[n]]$.

6. The method as recited in claim 1, the step of computing a PSD measurement vector $S_{yy}[n]$ comprising:

dividing the OFDM preamble y[n] into $N_K$ overlapping vectors of length $N_L$;

applying a spectral window to each of the $N_K$ overlapping vectors;

performing a length N Fast Fourier Transform (FFT) operation to each of the $N_K$ overlapping vectors of length $N_L$ to produce $N_K$ first FFT vectors; and computing a squared magnitude of each of the $N_K$ first FFT vectors and averaging the squared magnitudes to produce $S_{yy}[n]$.

7. The method as recited in claim 6, the step of computing a PSD measurement vector $S_{xx}[n]$ comprising:

dividing the OFDM preamble x[n] into $N_K$ overlapping vectors of length $N_L$;

applying a spectral window to each of the $N_K$ overlapping vectors;

performing a length N Fast Fourier Transform (FFT) operation to each of the $N_K$ overlapping vectors of length $N_L$ to produce $N_K$ second FFT vectors; and computing a squared magnitude of each of the $N_K$ second FFT vectors and averaging the squared magnitudes to produce $S_{xx}[n]$.

8. The method as recited in claim 7, the step of computing a cross-PSD measurement vector $S_{xy}[n]$ comprising:
multiplying complex conjugates of the $N_K$ first FFT vectors and the complex conjugates of the $N_K$ second FFT vectors together and averaging the multiplications to produce $S_{xy}[n]$.

9. The method as recited in claim 1, the PSD measurement vector $S_{SIG}[n]$ computed as $S_{SIG}[n]=\{S_{SIG}[n,s], s \in S_N\}$, wherein $S_N$ is a vector containing indices of N OFDM subchannels, s a subchannel number in $S_N$, and $$S_{SIG}[n,s] = \frac{|S_{xy}[n,s]|^2}{S_{xx}[n,s]}.$$

10. The method as recited in claim 9, the PSD measurement vector $S_{IPN}[n]$ computed as $S_{IPN}[n]=\{S_{IPN}[n,s], s \in S_N\}$, wherein $S_{IPN}[n,s]=S_{yy}[n,s]-S_{SIG}[n,s]$.

11. The method as recited in claim 9, the received signal power measurement vector $P_{SIG}[G[n]]$ computed as $P_{SIG}[G[n]]=\{P_{SIG}[G_i[n]], i=0, \ldots, r-1\}$, wherein r denotes a number of subchannel groups, $G_i[n]$ is an ith subchannel group in $G[n]$, $$P_{SIG}[G_i[n]] = 10\log_{10}\left(\frac{1}{NT_S} \sum_{s \in G_i[n]} S_{SIG}[n,s]\right),$$

and $T_s$ denotes an information source sampling time interval.

12. The method as recited in claim 10, the received IPN power measurement vector $P_{IPN}[G[n]]$ computed as $P_{IPN}[G[n]]=\{P_{IPN}[G_i[n]], i=0, \ldots, r-1\}$, wherein r denotes a number of subchannel groups, $G_i[n]$ is an ith subchannel group in $G[n]$, $$P_{IPN}[G_i[n]] = 10\log_{10}\left(\frac{1}{NT_S} \sum_{s \in G_i[n]} S_{IPN}[n,s]\right),$$

and $T_s$ denotes an information source sampling time interval.

13. The method as recited in claim 11, the received signal power measurement vector $P_{SIG}[G[n]]$ computed as a frame-averaged received signal power measurement vector $P_{AVG\_SIG}[G[n]]=\{P_{AVG\_SIG}[G_i[n]], i=0, \ldots, r-1\}$, wherein $P_{AVG\_SIG}[G_i[n]]=P_{AVG\_SIG}[G_i[n-1]]+\beta(P_{SIG}[G_i[n]]-P_{AVG}[G_i[n-1]])$, and $\beta$ is a smoothing parameter.

14. The method as recited in claim 12, the received IPN power measurement vector $P_{IPN}[G[n]]$ computed as a frame-averaged received IPN power measurement vector $P_{AVG\_IPN}[G[n]]=\{P_{AVG\_IPN}[G_i[n]], i=0, \ldots, r-1\}$, wherein $P_{AVG\_IPN}[G_i[n]]=P_{AVG\_IPN}[G_i[n-1]]+\alpha(P_{IPN}[G_i[n]]-P_{AVG\_IPN}G_i[n-1]])$, and a is a smoothing parameter.

15. The method as recited in claim 5, the received SINR measurement vector $\rho[G[n]]$ computed and quantized as vector $\rho[G[n]]=\{\rho[G_i[n]], i=0, \ldots, r-1\}$, wherein $\rho[G_i[n]]=Q(P_{AVG\_SIG}[G_i[n]]-P_{AVG\_IPN}[G_i[n]])$, and Q is a quantization function.

16. In a frame-based communications system utilizing orthogonal frequency division multiplexing (OFDM) and OFDM frames for multicarrier data transmission, each transmitted OFDM frame constructed from multiple time-domain OFDM symbols, one of the OFDM symbols being a known OFDM preamble, a signal to interference-plus-noise power ratio (SINR) apparatus for measuring the SINR of selected OFDM subchannel signals within the multicarrier data transmission to indicate channel quality and for adaptively adjusting groupings of the OFDM subchannel signals to increase network capacity, the SINR measurement apparatus comprising:
a processor programmed for
computing a power spectral density (PSD) measurement vector $S_{yy}[n]$ from an OFDM preamble y[n] received in an nth OFDM frame,
computing a PSD measurement vector $S_{xx}[n]$ from an OFDM preamble x[n] transmitted in the nth OFDM frame,
computing a cross-PSD measurement vector $S_{xy}[n]$ between x[n] and y[n] for the nth OFDM frame,
computing a PSD measurement vector $S_{SIG}[n]$ for the nth OFDM frame using $S_{xx}[n]$ and $S_{xy}[n]$,
computing a PSD measurement vector $S_{IPN}[n]$ for the nth OFDM frame using $S_{yy}[n]$ and $S_{SIG}[n]$,
specifying a subchannel grouping vector G[n] for the nth OFDM frame,
computing a received signal power measurement vector $P_{SIG}[G[n]]$ for the subchannel grouping vector G[n] using $S_{SIG}[n]$,
computing a received IPN power measurement vector $P_{IPN}[G[n]]$ for the subchannel grouping vector G[n] using $S_{IPN}[n]$, and
computing a received SINR measurement vector $\rho[G[n]]$ for the subchannel grouping vector G[n] using $P_{SIG}[G[n]]$ and $P_{IPN}[G[n]]$.

17. The SINR measurement apparatus as recited in claim 16, wherein the processor is further programmed for computing the received signal power measurement vector $P_{SIG}[G[n]]$ as a frame-averaged received signal power measurement vector $P_{AVG\_SIG}[G[n]]$ for the subchannel grouping vector G[n].

18. The SINR measurement apparatus as recited in claim 16, wherein the processor is further programmed for computing the received IPN power measurement vector $P_{IPN}[G[n]]$ as a frame-averaged received IPN power measurement vector $P_{AVG\_IPN}[G[n]]$ for the subchannel grouping vector G[n].

19. The SINR measurement apparatus as recited in claim 16, wherein the processor is further programmed for:
computing the received signal power measurement vector $P_{SIG}[G[n]]$ as a frame-averaged received signal power measurement vector $P_{AVG\_SIG}[G[n]]$ for the subchannel grouping vector G[n]; and
computing the received IPN power measurement vector $P_{IPN}[G[n]]$ as a frame-averaged received IPN power measurement vector $P_{AVG\_IPN}[G[n]]$ for the subchannel grouping vector G[n].

20. The SINR measurement apparatus as recited in claim 16, the processor further programmed for quantizing the received SINR measurement vector $\rho[G[n]]$.

21. The SINR measurement apparatus as recited in claim 16, the processor further programmed for computing a PSD measurement vector $S_{yy}[n]$ by:
dividing the OFDM preamble y[n] into $N_K$ overlapping vectors of length $N_L$;
applying a spectral window to each of the $N_K$ overlapping vectors;
performing a length N Fast Fourier Transform (FFT) operation to each of the $N_K$ overlapping vectors of length $N_L$ to produce $N_K$ first FFT vectors; and computing a squared magnitude of each of the $N_K$ first FFT vectors and averaging the squared magnitudes to produce $S_{yy}[n]$.

22. The SINR measurement apparatus as recited in claim 21, the processor further programmed for computing a PSD measurement vector $S_{xx}[n]$ by:
dividing the OFDM preamble $x[n]$ into $N_K$ overlapping vectors of length $N_L$;
applying a spectral window to each of the $N_K$ overlapping vectors;
performing a length N Fast Fourier Transform (FFT) operation to each of the $N_K$ overlapping vectors of length $N_L$ to produce $N_K$ second FFT vectors; and
computing a squared magnitude of each of the $N_K$ second FFT vectors and averaging the squared magnitudes to produce $S_{xx}[n]$.

23. The SINR measurement apparatus as recited in claim 22, the processor further programmed for computing a cross-PSD measurement vector $S_{xy}[n]$ by:
multiplying complex conjugates of the $N_K$ first FFT vectors and the complex conjugates of the $N_K$ second FFT vectors together and averaging the multiplications to produce $S_{xy}[n]$.

24. The SINR measurement apparatus as recited in claim 16, the processor further programmed for computing the PSD measurement vector $S_{SIG}[n]$ as $S_{SIG}[n]=\{S_{SIG}[n,s], s\in S_N\}$, wherein $S_N$ is a vector containing indices of N OFDM subchannels, s a subchannel number in $S_N$, and $$S_{SIG}[n,s] = \frac{|S_{xy}[n,s]|^2}{S_{xx}[n,s]}.$$

25. The SINR measurement apparatus as recited in claim 24, the processor further programmed for computing the PSD measurement vector $S_{IPN}[n]$ as $S_{IPN}[n]=\{S_{IPN}[n,s], s\in S_N\}$, wherein $S_{IPN}[n,s]=S_{yy}[n,s]-S_{SIG}[n,s]$.

26. The SINR measurement apparatus as recited in claim 24, the processor further programmed for computing the received signal power measurement vector $P_{SIG}[G[n]]$ as $P_{SIG}[G[n]]=\{P_{SIG}[G_i[n]], i=0,\ldots,r-1\}$, wherein r denotes a number of subchannel groups, $G_i[n]$ is an ith subchannel group in G[n], $$P_{SIG}[G_i[n]] = 10\log_{10}\left(\frac{1}{NT_S}\sum_{s\in G_i[n]} S_{SIG}[n,s]\right),$$

and $T_s$ denotes an information source sampling time interval.

27. The SINR measurement apparatus as recited in claim 25, the processor further programmed for computing the received IPN power measurement vector $P_{IPN}[G[n]]$ as $P_{IPN}[G[n]]=\{P_{IPN}[G_i[n]], i=0,\ldots,r-1\}$, wherein r denotes a number of subchannel groups, $G_i[n]$ is an ith subchannel group in G[n], $$P_{IPN}[G_i[n]] = 10\log_{10}\left(\frac{1}{NT_S}\sum_{s\in G_i[n]} S_{IPN}[n,s]\right),$$

and $T_s$ denotes an information source sampling time interval.

28. The SINR measurement apparatus as recited in claim 26, the processor further programmed for computing the received signal power measurement vector $P_{SIG}[G[n]]$ as a frame-averaged received signal power measurement vector $P_{AVG\_SIG}[G[n]]=\{P_{AVG\_SIG}[G_i[n]], i=0,\ldots,r-1\}$, wherein $P_{AVG\_SIG}[G_i[n]]=P_{AVG\_SIG}[G_i[n-1]]+\beta(P_{SIG}[G_i[n]]-P_{AVG\_SIG}[G_i[n-1]])$, and $\beta$ is a smoothing parameter.

29. The SINR measurement apparatus as recited in claim 27, the processor further programmed for computing the received IPN power measurement vector $P_{IPN}[G[n]]$ as a frame-averaged received IPN power measurement vector $P_{AVG\_IPN}[G[n]]=\{P_{AVG\_IPN}[G_i[n]], i=0,\ldots,r-1\}$, wherein $P_{AVG\_IPN}[G_i[n]]=P_{AVG\_IPN}[G_i[n-1]]+\alpha(P_{IPN}[G_i[n]]-P_{AVG\_IPN}[G_i[n-1]])$, and $\alpha$ is a smoothing parameter.

30. The SINR measurement apparatus as recited in claim 20, the processor further programmed for computing and quantizing the received SINR measurement vector $\rho[G[n]]$ as vector $\rho[G[n]]=\{\rho[G_i[n]], i=0,\ldots,r-1\}$, wherein $\rho[G_i[n]]=Q(P_{AVG\_SIG}[G_i[n]]-P_{AVG\_IPN}[G_i[n]])$, and Q is a quantization function.

* * * * *